US012750618B2

United States Patent
(12) United States Patent
Hwang

(10) Patent No.: US 12,750,618 B2
(45) Date of Patent: Sep. 29, 2026

(54) APPARATUS OUTPUTTING SOUND WITH SERIALLY CONNECTED VIBRATORS OPERATING AT DIFFERENT FREQUENCY BANDS

(71) Applicant: LG Display Co., Ltd., Seoul (KR)

(72) Inventor: Jaewon Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 150 days.

(21) Appl. No.: 18/533,463

(22) Filed: Dec. 8, 2023

(65) Prior Publication Data

US 2024/0214727 A1 Jun. 27, 2024

(30) Foreign Application Priority Data

Dec. 21, 2022 (KR) ........................ 10-2022-0180597

(51) Int. Cl.
*H04R 3/00* (2006.01)

(52) U.S. Cl.
CPC ..................................... *H04R 3/00* (2013.01)

(58) Field of Classification Search
CPC ....................................................... H04R 3/00
See application file for complete search history.

(56) References Cited

U.S. PATENT DOCUMENTS

2019/0004566 A1 1/2019 Lee et al.
2019/0018448 A1 1/2019 Lee et al.
2022/0141590 A1 5/2022 Scheek et al.
2022/0201399 A1* 6/2022 Kim ....................... H04R 1/028
2022/0210529 A1* 6/2022 Nam ...................... H04R 1/403
2022/0217472 A1* 7/2022 Ye ......................... H04R 17/00

FOREIGN PATENT DOCUMENTS

EP 3 343 272 A1 7/2018
WO 00/33612 A2 6/2000

OTHER PUBLICATIONS

GB Office Action dated Apr. 19, 2024 issued in Patent Application No. GB2317817.1 (6 pages).

* cited by examiner

*Primary Examiner* — Andrew Sniezek
(74) *Attorney, Agent, or Firm* — Fish & Richardson P.C.

(57) ABSTRACT

An apparatus includes a vibration member, a supporting member at a rear surface of the vibration member, a first vibration generating apparatus connected with the rear surface of the vibration member, and a second vibration generating apparatus between the vibration member and the supporting member, wherein the first vibration generating apparatus and the second vibration generating apparatus are serially connected with each other.

32 Claims, 8 Drawing Sheets

APPARATUS OUTPUTTING SOUND WITH SERIALLY CONNECTED VIBRATORS OPERATING AT DIFFERENT FREQUENCY BANDS

CROSS-REFERENCE TO RELATED APPLICATIONS

This application claims the benefit of the Korean Patent Application No. 10-2022-0180597 filed on Dec. 21, 2022, which is hereby incorporated by reference as if fully set forth herein.

TECHNICAL FIELD

The present disclosure relates to an apparatus, and more particularly, to an apparatus for outputting a sound.

BACKGROUND

Various devices may include a separate speaker or sound apparatus for providing a sound. When a speaker is provided in an apparatus, the speaker consumes space and limits the design and space arrangement of the apparatus.

However, a sound output from the speaker of the display apparatus may travel to a rearward or a downward direction of the display apparatus and sound quality may be degraded due to interference between sounds reflected from a wall and the ground. For this reason, it may be difficult to transfer an accurate sound, and the immersion experience of a viewer is reduced.

SUMMARY

The inventors have recognized the problems described above and have performed various experiments for enhancing a sound characteristic and/or a sound pressure level characteristic of an apparatus or a sound apparatus. Disclosed in an apparatus which may enhance the quality of a sound and a sound pressure level characteristic.

An aspect of the present disclosure is directed to providing an apparatus which may vibrate a vibration member to generate a vibration or a sound and may enhance a sound characteristic and/or a sound pressure level characteristic.

Another aspect of the present disclosure is directed to providing an apparatus which may vibrate a vibration member to generate a vibration or a sound and may output a sound of a middle-frequency band and a sound of a middle-low-frequency band.

Another aspect of the present disclosure is directed to providing an apparatus which may vibrate a vibration member to generate a vibration or a sound and may enhance a sound characteristic and/or a sound pressure level characteristic of a low-frequency band.

The objects of the present disclosure are not limited to the aforesaid, but other objects not described herein will be clearly understood by those skilled in the art from descriptions below.

An apparatus according to an aspect of the present disclosure may include a vibration apparatus which includes a vibration member, a supporting member at a rear surface of the vibration member, a first vibration generating apparatus connected with the rear surface of the vibration member, and a second vibration generating apparatus between the vibration member and the supporting member, and the first vibration generating apparatus may be connected with the second vibration generating apparatus in series.

Details of other aspects are included in the detailed description and the drawings.

An apparatus according to an aspect of the present disclosure may include a vibration apparatus vibrating a vibration member or a display panel, and thus, may generate a sound so that the sound travels in a forward direction of the vibration member or the display panel.

An apparatus according to an aspect of the present disclosure may include a vibration apparatus including a coil type and a piezoelectric type, and thus, may output a sound of a middle-high-frequency band and a sound of a middle-low-frequency band.

An apparatus according to an aspect of the present disclosure may be implemented in a stack structure where a coil type vibration apparatus and a piezoelectric type vibration apparatus are integrated, and thus, a gap interval of an internal space between a vibration member and a supporting member may be reduced, thereby enhancing a sound characteristic and/or a sound pressure level characteristic of a low-frequency band.

An apparatus according to an aspect of the present disclosure may be implemented in a serial connection structure where a coil type vibration apparatus and a piezoelectric type vibration apparatus are connected with each other in series, and thus, a load of a sound processing circuit may decrease, a configuration of the apparatus may be simplified, the manufacturing cost may be reduced by process optimization, and productivity and reliability may be enhanced.

The effects of the present disclosure are not limited to the aforesaid, but other effects not described herein will be clearly understood by those skilled in the art from descriptions below.

The details of the present disclosure described in technical problem, technical solution, and advantageous effects do not specify essential features of claims, and thus, the scope of claims is not limited by the details described in detailed description of the disclosure.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

DETAILED DESCRIPTION

Figure 1:
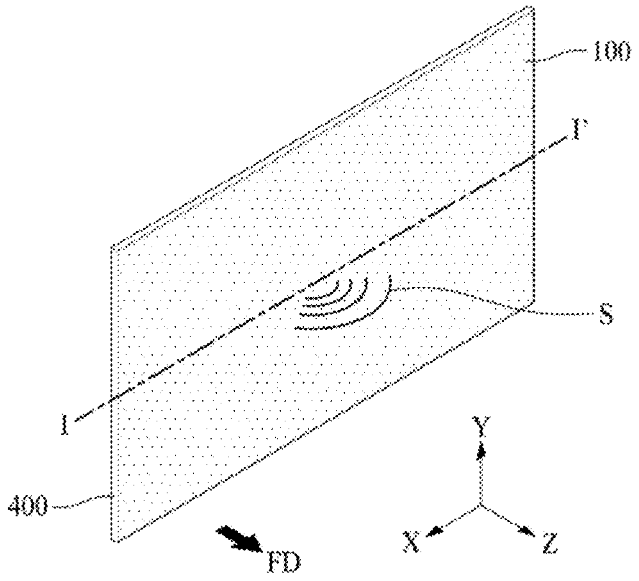
FIG. 1 illustrates an apparatus according to an aspect of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first", "second", etc. may be used herein to describe various elements, these elements should not be limited by these terms. These terms are only used to partition one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer may not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of an apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Non-limiting examples of the display apparatus may include a narrow-sense display apparatus itself, such as an LCM or an OLED module, and a set device which is a final consumer device or an application product including the LCM or the OLED module.

In some aspects, an LCM or an OLED module including a display panel and a driver may be referred to as a narrow-sense display apparatus, and an electronic device which is a final product including an LCM or an OLED module may be referred to as a set device. For example, the narrow-sense display apparatus may include a display panel, such as a liquid crystal display (LCD) or an OLED, and a source printed circuit board (PCB) which is a controller for driving the display panel. The set device may further include a set PCB which is a set controller electrically connected to the source PCB to overall control the set device.

A display panel applied to an aspect of the present aspect may use all types of display panels such as a liquid crystal display panel, an OLED display panel, a quantum dot (QD) display panel, and an electroluminescent display panel. The display panel according to the present aspect is not limited to a specific display panel capable of being bezel-bent in a lower back plate supporting structure and a flexible substrate for OLED display panels. Also, a shape or a size of a display panel applied to a display apparatus according to the present aspect is not limited to the descriptions herein.

For example, when the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. A layer provided on the array substrate may include an inorganic light emitting layer (for example, a nano-sized material layer, a quantum dot, or the like).

Features of various aspects of the present disclosure may be partially or overall coupled to or combined with each other, and may be variously interoperated with each other and driven technically as those skilled in the art may sufficiently understand. The aspects of the present disclosure may be carried out independently from each other, or may be carried out together in co-dependent relationship.

Hereinafter, aspects of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
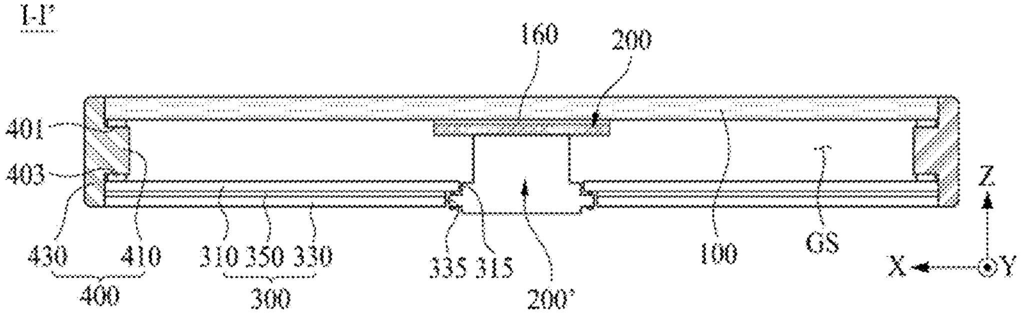
FIG. 2 is a cross-sectional view taken along line I-I' illustrated in FIG. 1.

FIG. 1 illustrates an apparatus according to an aspect of the present disclosure, and FIG. 2 is a cross-sectional view taken along line I-I' illustrated in FIG. 1.

With reference to FIGS. 1 and 2, the apparatus according to an aspect of the present disclosure may include a vibration member 100 and a vibration apparatus 200 and vibration apparatus 200' disposed at a rear surface (or a backside) of the vibration member 100. For example, the vibration member 100 may be a vibration object, a display panel, a vibration plate, or a front member, but aspects of the present disclosure are not limited thereto. Hereinafter, an example where a vibration member is a display panel will be described.

The vibration member 100 according to an aspect of the present disclosure may be a display panel displaying an image. The display panel may display an electronic image, a digital image, a still image or a video image. For example, the display panel may output light to display an image. The display panel may be a curved display panel, or may be any type of display panel, such as a liquid crystal display panel, an organic light-emitting display panel, a quantum dot light-emitting display panel, a micro light-emitting diode display panel, and an electrophoresis display panel. The display panel may be a flexible display panel. For example, the display panel may a flexible light emitting display panel, a flexible electrophoretic display panel, a flexible electrowetting display panel, a flexible micro light emitting diode display panel, or a flexible quantum dot light emitting display panel, but aspects of the present disclosure are not limited thereto.

The display panel according to an aspect of the present disclosure may include a display area (or an active area) for displaying an image according to driving of the plurality of pixels. The display panel may include a non-display area (or an inactive area) surrounding the display area, but aspects of the present disclosure are not limited thereto.

The display panel according to an aspect of the present disclosure may include an anode electrode, a cathode electrode, and a light emitting device, and may be configured to display an image in a type such as a top emission type, a bottom emission type, or a dual emission type, according to a structure of a pixel array layer including a plurality of pixels. In the top emission type, an image may be displayed by outputting visible light generated from the pixel array layer to the forward region of a base substrate. In the bottom emission type, an image may be displayed by outputting visible light generated from the pixel array layer to the backward region of the base substrate.

The display panel according to an aspect of the present disclosure may include a pixel array portion disposed at the substrate. The pixel array portion may include a plurality of pixels which display an image based on a signal supplied through the signal lines. The signal lines may include a gate line, a data line and a pixel driving power line, or the like, but aspects of the present disclosure are not limited thereto.

Each of the plurality of pixels may include a pixel circuit layer including a driving TFT provided at the pixel area which is configured by a plurality of gate lines and/or a plurality of data lines, an anode electrode electrically connected to the driving TFT, a light emitting layer formed over the anode electrode, and a cathode electrode electrically connected to the light emitting layer.

The driving TFT may be configured at a transistor region of each pixel area provided at a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but aspects of the present disclosure are not limited thereto.

The anode electrode may be provided at an opening region provided at each pixel area and may be electrically connected to the driving TFT.

A light emitting device according to an aspect of the present disclosure may include an organic light emitting device layer formed over an anode electrode. The organic light emitting device layer may be implemented to emit light having the same color (for example, white light) for each pixel, or may be implemented to emit light having a different color (for example, red light, green light, or blue light) for each pixel. A cathode electrode (or a common electrode) may be commonly connected to the organic light emitting device layer provided in each pixel area. For example, the organic light emitting device layer may have a stack structure including a single structure or two or more structures including the same color for each pixel. As another aspect of the present disclosure, the organic light emitting device layer may have a stack structure including two or more structures including one or more different colors for each pixel. The two or more structures including the one or more different colors may be configured with one or more of blue, red, yellow-green, and green or a combination thereof, but aspects of the present disclosure are not limited thereto. An example of the combination may include blue and red, red and yellow-green, red and green, red/yellow-green/green, or the like, but aspects of the present disclosure are not limited thereto. Also, regardless of a stack order thereof, the present disclosure may be applied. The stack structure including two or more structures having the same color or one or more different colors may further include a charge generating layer between the two or more structures. The charge generating layer may have a PN junction structure and may include an N-type charge generating layer and a P-type charge generating layer.

According to another aspect of the present disclosure, the light emitting device may include a micro light emitting diode device electrically connected to each of an anode electrode and a cathode electrode. The micro light emitting diode device may be a light emitting diode implemented as an integrated circuit (IC) or chip type. The micro light emitting diode device may include a first terminal electrically connected to the anode electrode and a second terminal electrically connected to the cathode electrode. The cathode electrode may be connected to the second terminal of the micro light emitting diode device provided in each pixel area.

An encapsulation part may be formed on the substrate to encapsulate the pixel array portion, thereby preventing oxygen or water from penetrating into the light emitting device layer of the pixel array portion. The encapsulation part according to an aspect of the present disclosure may be formed in a multi-layer structure where an organic material layer and an inorganic material layer are alternately stacked, but the configuration is not limited thereto. The inorganic material layer may prevent oxygen or water from penetrating into the light emitting device layer of the pixel array portion. The organic material layer may be formed to have a thickness which is relatively thicker than the inorganic material layer to cover particles occurring in a manufacturing process. For example, the encapsulation part may include a first inorganic layer, an organic layer on the first inorganic layer, and a second inorganic layer on the organic layer. The organic layer may be a particle cover layer. The touch panel may be disposed at the encapsulation part, or may be disposed at a rear surface of the pixel array portion.

The display panel according to an aspect of the present disclosure may include a first substrate, a second substrate, and a liquid crystal layer. The first substrate may be an upper substrate or a TFT array substrate. For example, the first substrate may include a pixel array (or a display part or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate may further include a pad part provided at a first periphery (or a first non-display part) and a gate driving circuit provided at a second periphery (or a second non-display part).

The pad part may supply a signal, provided from an outside source, to the pixel array and/or the gate driving circuit. For example, the pad part may include a plurality of data pads connected to a plurality of data lines through a plurality of data link lines and/or a plurality of gate input pads connected to the gate driving circuit through a gate control signal line. For example, a size of the first substrate may be greater than the second substrate, but aspects of the present disclosure are not limited thereto.

The gate driving circuit (or a scan driving circuit) according to an aspect of the present disclosure may be embedded (or integrated) into a second periphery of the first substrate to be connected to the plurality of gate lines. For example, the gate driving circuit may be implemented with a shift register including a transistor, which is formed through the same process as the TFT provided at the pixel area. According to another aspect of the present disclosure, the gate driving circuit may be implemented as an IC and may be provided at a panel driving circuit, without being embedded into the first substrate.

The second substrate may be a lower substrate or a color filter array substrate. For example, the second substrate may include a pixel pattern (or a pixel defining pattern or a black matrix) including an opening area overlapping with the pixel area formed in the first substrate, and a color filter layer formed at the opening area. The second substrate may have a size which is smaller than the first substrate, but aspects of the present disclosure are not limited thereto. For example, the second substrate may overlap a remaining portion, other than the first periphery, of the upper substrate. The second substrate may be attached to a remaining portion, other than the first periphery, of the first substrate with a liquid crystal layer therebetween using a sealant.

In some cases, a liquid crystal layer may be disposed between the first substrate and the second substrate. The liquid crystal layer includes liquid crystal molecules where an alignment direction is changed based on an electric field generated by the common voltage and a data voltage applied to a pixel electrode for each pixel.

A second polarization member may be attached on a bottom surface of the second substrate and may polarize light which is incident from the backlight and travels to the liquid crystal layer. A first polarization member may be attached on a top surface of the first substrate and may polarize light which passes through the first substrate and is output to the outside.

The display panel according to an aspect of the present disclosure may drive the liquid crystal layer based on an electric field generated in each pixel by the data voltage and the common voltage applied to each pixel, and thus, may display an image based on light passing through the liquid crystal layer.

In display panel according to another aspect of the present disclosure, the first substrate may be implemented as the color filter array substrate, and the second substrate may be implemented as the TFT array substrate. For example, the display panel according to another aspect of the present disclosure may comprise an upper portion and a lower portion of the display panel according to an aspect of the present disclosure that are reversed. For example, a pad part of the display panel according to another aspect of the present disclosure may be covered by a separate mechanism or structure.

The display panel according to an aspect of the present disclosure may include a bending portion that may be bent or curved to have a curved shape or a certain curvature radius.

The bending portion of the display panel may be in at least one or more of one periphery and the other periphery of the display panel, which are parallel to each other. The one periphery and/or the other periphery, where the bending portion is implemented, of the display panel may include only the non-display area, or may include a periphery of the display area and the non-display area. The display panel including the bending portion implemented by bending of the non-display area may have a single side bezel bending structure or a dual side bezel bending structure. Also, the display panel including the bending portion implemented by bending of the periphery of the display area and the non-display area may have a single side active bending structure or a dual side active bending structure.

According to another aspect of the present disclosure, the vibration member 100 may include one or more of metal, wood, plastic, paper, fiber, cloth, leather, rubber, carbon, and glass, but aspects of the present disclosure are not limited thereto. For example, the paper may be configured as a cone for speakers. For example, the cone may be formed from a pulp or foam plastic, but aspects of the present disclosure are not limited thereto.

According to another aspect of the present disclosure, the vibration member 100 may include one or more of a display panel including a pixel displaying an image, a screen panel on which an image is projected from a display apparatus, a lighting panel, a signage panel, a vehicular (or car or automotive) interior material, a vehicular glass window, a vehicular exterior material, a ceiling material of a building, an interior material of a building, a glass window of a building, and mirror, but aspects of the present disclosure are not limited thereto. For example, the display panel may be a curved display panel or various types of display panels such as a liquid crystal display panel, an organic light emitting display panel, a quantum dot light emitting display panel, a micro light emitting diode display panel, and an electrophoresis display panel. In some aspects, the display panel may be a flexible display panel. For example, the flexible display panel may be a flexible light emitting display panel, a flexible electrophoresis display panel, a flexible electro-wetting display panel, a flexible micro light emitting diode display panel, or a flexible quantum dot light emitting display panel, but aspects of the present disclosure are not limited thereto. For example, a lighting panel (or a non-display panel) may be a light emitting diode lighting panel (or apparatus), an organic light emitting diode lighting panel (or apparatus), or an inorganic light emitting diode lighting panel (or apparatus), but aspects of the present disclosure are not limited thereto.

The vibration apparatuses 200 and 200' may be configured to vibrate the vibration member 100. For example, the vibration apparatuses 200 and 200' may directly or indirectly vibrate the vibration member 100. In some aspects, the vibration apparatuses 200 and 200' may be implemented at a rear surface of the vibration member 100. For example, the vibration apparatuses 200 and 200' may vibrate the rear surface of the vibration member 100, and thus, may provide a user with a sound S and/or a haptic feedback, based on a vibration of the vibration member 100. For example, the vibration member 100 may output the sound S, based on vibrations of the vibration apparatuses 200 and 200'. The vibration apparatuses 200 and 200' may output the sound S by using the vibration member 100 as a vibration plate. For example, the vibration apparatuses 200 and 200' may output the sound S in a forward or front direction FD by vibrating a portion of vibration member 100. For example, the vibration apparatuses 200 and 200' may generate the sound S so that the sound travels in a forward (or front) direction FD of the display panel or the vibration member 100. The vibration apparatuses 200 and 200' may vibrate the vibration member 100 to output the sound S. For example, the vibration apparatuses 200 and 200' may directly vibrate the vibration member 100 to output the sound S in the forward (or front) direction FD of the apparatus. The vibration apparatuses 200 and 200' may indirectly vibrate the vibration member 100 to output the sound S.

According to an aspect of the present disclosure, the vibration apparatuses 200 and 200' may vibrate based on a vibration driving signal that is synchronized with an image displayed by the display panel. According to another aspect of the present disclosure, the vibration apparatuses 200 and 200' may vibrate based on a haptic feedback signal (or a tactile feedback signal) that is synchronized with a user touch applied to a touch panel (or a touch sensor layer) that is disposed in or embedded into the display panel. Accordingly, the display panel may vibrate based on the vibration apparatuses 200 and 200' to provide a user (or a viewer) with at least one of the sound S and the haptic feedback.

The vibration apparatuses 200 and 200' according to an aspect of the present disclosure may include the first vibration generating apparatus 200 and the second vibration generating apparatus 200'. For example, the first vibration generating apparatus 200 may be connected with the rear surface of the display panel or the vibration member 100. The second vibration generating apparatus 200' may be between the vibration member 100 or the display panel and the supporting member 300 and may overlap the first vibration generating apparatus 200.

The first vibration generating apparatus 200 according to an aspect of the present disclosure may be implemented as a piezoelectric type vibration apparatus. For example, the first vibration generating apparatus 200 may be implemented as a film type. The first vibration generating apparatus 200 may be configured to output a sound of a first frequency band. For example, the first frequency band may include a high frequency sound band. In some other case, the first frequency band may be the high-frequency band or a middle-high-frequency band. The first vibration generating apparatus 200 may be implemented as a film type, and thus, may have a thickness which is thinner than the vibration member 100 or the display panel, thereby minimizing an increase in thickness of the vibration member 100 or the display panel caused by the disposition of the first vibration generating apparatus 200. For example, the first vibration generating apparatus 200 may be referred to as a first vibration apparatus, a first sound generating module, a first sound generating apparatus, a first displacement apparatus, a first sound apparatus, a piezoelectric type vibration apparatus, a film actuator, a film type piezoelectric composite actuator, a film speaker, a film type piezoelectric speaker, or a film type piezoelectric composite speaker, which uses the vibration member 100 or the display panel as a sound vibration plate, but the terms are not limited thereto.

The first vibration generating apparatus 200 may be connected with or coupled to the rear surface of the vibration member 100 or the display panel. For example, the first vibration generating apparatus 200 may be disposed at the rear surface of the vibration member 100 or the display panel to overlap a display area of the vibration member 100 or the display panel. For example, the first vibration generating apparatus 200 may overlap half or more of the display area of the vibration member 100 or the display panel. According to another aspect of the present disclosure, the first vibration generating apparatus 200 may overlap all of the display area of the vibration member 100 or the display panel.

When an alternating current (AC) voltage is applied, the first vibration generating apparatus 200 according to an aspect of the present disclosure may alternately contract and/or expand based on an inverse piezoelectric effect to vibrate and may cause the vibration member 100 or the display panel to vibrate. For example, the first vibration generating apparatus 200 may vibrate based on a voice signal synchronized with a displayed image to vibrate the vibration member 100 or the display panel. According to another aspect of the present disclosure, the first vibration generating apparatus 200 may vibrate based on a haptic feedback signal (or a tactile feedback signal) that is synchronized with a user touch applied to a touch panel (or a touch sensor layer) disposed in or embedded into the vibration member 100 or the display panel. Accordingly, the vibration member 100 or the display panel may vibrate based on the first vibration generating apparatus 200 to provide a user (or a viewer) with at least one of a sound and the haptic feedback.

The apparatus according to an aspect of the present disclosure may output a sound, which is generated by a vibration of the vibration member 100 or the display panel based on a vibration of the first vibration generating apparatus 200, in a forward direction of the vibration member 100 or the display panel. Also, in the apparatus according to an aspect of the present disclosure, a region of the vibration member 100 or the display panel may be vibrated by the first vibration generating apparatus 200 of a film type, thereby more enhancing a sense of localization and a sound pressure level characteristic of a sound.

The apparatus according to an aspect of the present disclosure may further include a connection member 160 (e.g., a first connection member) between the vibration member 100 or the display panel and the first vibration generating apparatus 200.

The connection member 160 may be disposed between a rear surface (or a backside surface) of the display panel or the vibration member 100 and the first vibration generating apparatus 200 to connect or couple the first vibration generating apparatus 200 to the rear surface of the display panel or the vibration member 100. For example, the first vibration generating apparatus 200 may be connected or coupled to the rear surface of the display panel or the vibration member 100 by using a connection member 160, and thus, may be supported by or disposed at the rear surface of the display panel or the vibration member 100. For example, the first vibration generating apparatus 200 may be disposed at the rear surface of the display panel or the vibration member 100 by using the connection member 160.

The connection member 160 according to an aspect of the present disclosure may include an adhesive layer having a tacky force or adhesive force, with respect to each of the first vibration generating apparatus 200 and the rear surface of the vibration member 100 or the display panel. For example, the connection member 160 may include a foam pad, a double-sided tape, or an adhesive, but aspects of the present disclosure are not limited thereto. For example, the adhesive layer of the connection member 160 may include epoxy, acryl, silicone, or urethane, but aspects of the present disclosure are not limited thereto. For example, the adhesive layer of the connection member 160 may include an acrylic material (or substance), having a characteristic where an adhesive force is relatively good and hardness is high, of acryl and urethane. Accordingly, a vibration of the first vibration generating apparatus 200 may be transferred to the vibration member 100 or the display panel.

The adhesive layer of the connection member 160 may further include an additive such as a tackifier, a wax component, or an antioxidant, but aspects of the present disclosure are not limited thereto. The additive may prevent the connection member 160 from being detached (or stripped) from the vibration member 100 or the display panel by a vibration of the vibration apparatus 200. For example, the tackifier may be rosin derivatives, and the wax component may be a paraffin wax. For example, the antioxidant may be a phenolic antioxidant such as thiolester, but aspects of the present disclosure are not limited thereto.

The connection member 160 according to another aspect may further include a hollow portion provided between the vibration member 100 or the display panel and the first vibration generating apparatus 200. The hollow portion of the connection member 160 may provide an air gap between the vibration member 100 or the display panel and the first vibration generating apparatus 200. The air gap may allow a sound wave (e.g., a sound pressure level) based on a vibration of the first vibration generating apparatus 200 to concentrate on the vibration member 100 or the display panel without being dispersed by the connection member 160, and thus, the loss of a vibration by the connection member 160 may be minimized and increasing a sound characteristic and/or a sound pressure level characteristic of a sound generated.

The second vibration generating apparatus 200' according to an aspect of the present disclosure may be implemented as a coil type vibration apparatus. For example, the second vibration generating apparatus 200' may be implemented as a voice coil type. The second vibration generating apparatus 200' may be configured to output a sound of a second frequency band which differs from the first frequency band. For example, the second frequency band may include a low-frequency band. The second frequency band may be a sound of the low-frequency band or a middle-low-frequency band. The second vibration generating apparatus 200' may be provided to overlap the first vibration generating apparatus 200. The second vibration generating apparatus 200' may be separated from the rear surface of the vibration member 100. The second vibration generating apparatus 200' may be separated from the rear surface of the vibration member 100, and the first vibration generating apparatus 200 may be disposed between the vibration member 100 and the second vibration generating apparatus 200'. For example, the second vibration generating apparatus 200' may be stacked on the first vibration generating apparatus 200. The second vibration generating apparatus 200' may pass through the supporting member 300 and may be disposed adjacent to the rear surface of the first vibration generating apparatus 200. The second vibration generating apparatus 200' may disposed to pass through the supporting member 300 and may contact the rear surface of the first vibration generating apparatus 200. The second vibration generating apparatus 200' may pass through the supporting member 300 and may be disposed at the rear surface of the vibration member 100 with the first vibration generating apparatus 200 therebetween, and thus, may directly or indirectly vibrate the vibration member 100. For example, an upper portion of the second vibration generating apparatus 200' may be inserted (or accommodated) into through holes 315 and 335 (or a first hole) provided in the supporting member 300 and may be adjacent to or connected with the rear surface of the first vibration generating apparatus 200, and a lower portion of the second vibration generating apparatus 200' may be supported by (or fixed to) the supporting member 300. For example, the second vibration generating apparatus 200' may use the supporting member 300 to directly or indirectly vibrate the vibration member 100, and the vibration member 100 may output the sound S in the forward direction FD. For example, the second vibration generating apparatus 200' may be referred to as a second apparatus, a second sound generating module, a second sound generating apparatus, a second displacement apparatus, a second sound apparatus, a coil type vibration apparatus, a voice coil type vibration apparatus, a transducer, an actuator, or an exciter, which uses the vibration member 100 or the display panel as a sound vibration plate, but the terms are not limited thereto.

In the apparatus according to an aspect of the present disclosure, the first vibration generating apparatus 200 may be disposed between the vibration member 100 and the second vibration generating apparatus 200'.

The first vibration generating apparatus 200 may be disposed at the rear surface of the vibration member 100, and the second vibration generating apparatus 200' may be disposed at the rear surface of the first vibration generating apparatus 200. The first vibration generating apparatus 200 may be disposed between the vibration member 100 and the second vibration generating apparatus 200' and may reduce or decrease thermal energy generated in the second vibration generating apparatus 200'. For example, the first vibration generating apparatus 200 may prevent or minimize the transfer of heat, occurring in the second vibration generating apparatus 200', to the vibration member 100. The first vibration generating apparatus 200 may limit the local temperature rise of the vibration member 100 caused by heat occurring in the second vibration generating apparatus 200'. For example, the first vibration generating apparatus 200 may prevent or minimize the transfer of heat, occurring in the second vibration generating apparatus 200', to the display panel. In this case, the first vibration generating apparatus 200 may limit the temperature rise of the display panel or the vibration member 100 based on when the display panel or the vibration member 100 outputs a sound. In this case, the first vibration generating apparatus 200 may prevent an image quality defect of the display panel or the vibration member 100 from occurring due to a rapid temperature difference in a local region of the display panel or the vibration member 100 overlapping the second vibration generating apparatus 200'.

According to an aspect of the present disclosure, the first vibration generating apparatus 200 may be disposed at the rear surface of the display panel or the vibration member 100 by using the connection member 160. The first vibration generating apparatus 200 may be configured to have a size, which is greater than that of the second vibration generating apparatus 200', or cover the second vibration generating apparatus 200'. For example, the first vibration generating apparatus 200 may have a polygonal plate shape or a circular plate shape having a certain thickness, but aspects of the present disclosure are not limited thereto. In the apparatus according to an aspect of the present disclosure, the first vibration generating apparatus 200 may prevent or minimize the transfer of heat from the second vibration generating apparatus 200' to the vibration member 100 and may decrease an adverse effect of heat that affects the image quality of the display panel.

In the apparatus according to an aspect of the present disclosure, the first vibration generating apparatus 200 and the second vibration generating apparatus 200' may be serially connected with each other. For example, the first vibration generating apparatus 200 and the second vibration generating apparatus 200' may receive a vibration driving signal (or a voice signal or a sound signal), provided from a sound processing circuit, through a single signal path. The first vibration generating apparatus 200 and the second vibration generating apparatus 200' may be connected with the sound processing circuit through the single signal path of a closed loop type. For example, the single signal path may connect the first vibration generating apparatus 200 with the second vibration generating apparatus 200' in a closed loop type with the sound processing circuit therebetween. For example, the sound processing circuit may output a positive (+) vibration driving signal and a negative (−) vibration driving signal. The positive (+) vibration driving signal may be supplied through a positive (+) signal terminal of the first vibration generating apparatus 200. The negative (−) vibration driving signal may be supplied through a negative (−) signal terminal of the second vibration generating apparatus 200'. The first vibration generating apparatus 200 and the second vibration generating apparatus 200' may be serially connected with each other, and the negative (−) signal terminal of the first vibration generating apparatus 200 may be connected with the positive (+) signal terminal of the second vibration generating apparatus 200'. For example, the positive (+) vibration driving signal output from the sound processing circuit may be supplied to only the first vibration generating apparatus 200, and the negative (−) vibration driving signal may not be supplied to the first vibration generating apparatus 200. The negative (−) vibration driving signal output from the sound processing circuit may only be supplied to the second vibration generating apparatus 200', and the positive (+) vibration driving signal may not be supplied to the second vibration generating apparatus 200'. Alternatively, the positive (+) vibration driving signal may be supplied through a positive (+) signal terminal of the second vibration generating apparatus 200'. The negative (−) vibration driving signal may be supplied through a negative (−) signal terminal of the first vibration generating apparatus 200. The first vibration generating apparatus 200 and the second vibration generating apparatus 200' may be serially connected with each other, and the positive (+) signal terminal of the first vibration generating apparatus 200 may be connected with the negative (−) signal terminal of the second vibration generating apparatus 200'. For example, the positive (+) vibration driving signal may be only supplied to the second vibration generating apparatus 200', and the negative (−) vibration driving signal may not be supplied to the second vibration generating apparatus 200'. The negative (−) vibration driving signal may be only supplied to the first vibration generating apparatus 200, and the positive (+) vibration driving signal may not be supplied to the first vibration generating apparatus 200.

The apparatus according to an aspect of the present disclosure may further include a supporting member 300 which is disposed at a rear surface (or a backside surface) of the vibration member 100.

The supporting member 300 may be disposed at the rear surface of the vibration member 100 or the display panel. For example, the supporting member 300 may cover the rear surface of the vibration member 100 or the display panel. For example, the supporting member 300 may cover the whole rear surface of the vibration member 100 or the display panel with a gap space GS (e.g., an internal space) therebetween. The supporting member 300 may be separated from a rearmost surface of the vibration member 100 or the display panel with the gap space GS therebetween, or may be separated from the first vibration generating apparatus 200. For example, the gap space GS may be referred to as an internal space, an air gap, a vibration space, or a sound sounding box, but the terms are not limited thereto.

For example, the supporting member 300 may include one or more materials of a glass material, a metal material, and a plastic material. For example, the supporting member 300 may be a rear structure material, a set structure material, a supporting structure material, a supporting cover, a rear member, a case, or a housing, but the terms are not limited thereto. The supporting member 300 may be referred to as other terms such as a cover bottom, a plate bottom, a back cover, a base frame, a metal frame, a metal chassis, a chassis base, or an m-chassis. For example, the supporting member 300 may be implemented as an arbitrary type frame or a plate structure material each disposed at the rear surface of the vibration member 100.

An edge or a sharp corner of the supporting member 300 may have an inclined shape or a curved shape through a chamfer process or a corner rounding process. For example, the glass material of the supporting member 300 may be sapphire glass. In another aspect of the present disclosure, the supporting member 300 including the metal material may include one or more materials of aluminum (Al), an Al alloy, magnesium (Mg), a Mg alloy, and an iron (Fe)-nickel (Ni) alloy.

The supporting member 300 according to an aspect of the present disclosure may include the through holes 315 and 335 into which the second vibration generating apparatus 200' is inserted (or accommodated). For example, the through holes 315 and 335 may be punched to have a circular or polygonal shape in a predetermined partial region of the supporting member 300 in a thickness direction Z of the supporting member 300, so that the second vibration generating apparatus 200' is inserted (or accommodated) therein.

The supporting member 300 according to an aspect of the present disclosure may include a first supporting member 310 and a second supporting member 330.

The first supporting member 310 may be disposed between the second supporting member 330 and the rear surface of the vibration member 100 or the display panel. For example, the first supporting member 310 may be disposed between a rear edge of the vibration member 100 or the display panel and a front edge portion of the second supporting member 330. The first supporting member 310 may support one or more edge portions of the vibration member 100 or the display panel and an edge portion of the second supporting member 330. In another aspect of the present disclosure, the first supporting member 310 may cover the rear surface of the vibration member 100 or the display panel. For example, the first supporting member 310 may cover the whole rear surface of the vibration member 100 or the display panel. For example, the first supporting member 310 may cover the whole rear surface of the vibration member 100 or the display panel. For example, the first supporting member 310 may include one or more materials of a glass material, a metal material, and a plastic material. For example, the first supporting member 310 may be an inner plate, a first rear structure material, a first supporting structure material, a first supporting cover, a first back cover, a first rear member, an internal plate, or an internal cover, but the terms are not limited thereto. For example, the first supporting member 310 may be omitted.

The first supporting member 310 may be separated from a rearmost surface of the vibration member 100 based on the gap space GS. The first supporting member 310 may support or fix the vibration generating apparatus 200. The gap space GS may also be referred to as an internal space, an air gap, a vibration space, or a sound sounding box, but the terms are not limited thereto.

The second supporting member 330 may be disposed at a rear surface of the first supporting member 310. The second supporting member 330 may cover the whole rear surface of the vibration member 100 or the display panel. For example, the second supporting member 330 may include one or more materials of a glass material, a metal material, and a plastic material. For example, the second supporting member 330 may be an outer plate, a rear plate, a back plate, a back cover, a rear cover, a second rear structure material, a second supporting structure material, a second supporting cover, a second back cover, a second rear member, an external plate, or an external cover, but the terms are not limited thereto.

According to an aspect of the present disclosure, the first supporting member 310 and the second supporting member 330 may each include through holes 315 and 335 into which the second vibration generating apparatus 200' is inserted (or accommodated). For example, the through holes 315 and 335 may have a circular or polygonal shape in a predetermined partial region of each of the first supporting member 310 and the second supporting member 330 in a thickness direction Z of the first supporting member 310 and the second supporting member 330, so that the second vibration generating apparatus 200' is inserted (or accommodated) therein. For example, a first through hole 315 of the first supporting member 310 may have the same size as that of a second through hole 335 of the second supporting member 330, or may have a size which is less than that of the second through hole 335 of the second supporting member 330. For example, the first through hole 315 of the first supporting member 310 may have a size which is less than that of the second through hole 335 of the second supporting member 330, and a portion of the rear surface of the first supporting member 310 may be exposed through the second through hole 335. In this case, the second vibration generating apparatus 200' may be fixed or coupled to the rear surface of the first supporting member 310 that is exposed by the second through hole 335. For example, an upper portion (or one side) of the second vibration generating apparatus 200' may pass through the through holes 315 and 335 of the first supporting member 310 and the second supporting member 330 and may contact the rear surface of the first vibration generating apparatus 200, and a lower portion (or the other side) of the second vibration generating apparatus 200' may be fixed or coupled to the rear surface of the first supporting member 310 exposed by the second through hole 335 of the second supporting member 330. According to an aspect of the present disclosure, the second vibration generating apparatus 200' may not overlap the first vibration generating apparatus 200, and the upper portion (or the one side) of the second vibration generating apparatus 200' may pass through the through holes 315 and 335 of the first supporting member 310 and the second supporting member 330 and may contact the rear surface of the display panel or the vibration member 100, and the lower portion (or the other side) of the second vibration generating apparatus 200' may be fixed or coupled to the rear surface of the first supporting member 310 exposed by the second through hole 335. According to an aspect of the present disclosure, the first supporting member 310 and the second supporting member 330 may include different materials. For example, the first supporting member 310 may include a metal material such as an aluminum (Al) material which is good in thermal conductivity, and the second supporting member 330 may include a glass material, but aspects of the present disclosure are not limited thereto.

According to an aspect of the present disclosure, the first supporting member 310 and the second supporting member 330 may have the same thickness or different thicknesses. For example, the first supporting member 310 may have a thickness which is relatively thinner than the second supporting member 330, but aspects of the present disclosure are not limited thereto.

The supporting member 300 according to an aspect of the present disclosure may further include a connection member 350.

The connection member 350 may be disposed between the first supporting member 310 and the second supporting member 330. For example, the first supporting member 310 and the second supporting member 330 may be coupled to or connected with each other by the connection member 350. For example, the connection member 350 may be an adhesive resin, a double-sided tape, or a double-sided adhesive foam pad, but aspects of the present disclosure are not limited thereto. For example, the connection member 350 may have elasticity for absorbing an impact, but aspects of the present disclosure are not limited thereto. For example, the connection member 350 may be disposed in a whole region between the first supporting member 310 and the second supporting member 330. According to another aspect of the present disclosure, the connection member 350 may be formed in a mesh structure having an air gap between the first supporting member 310 and the second supporting member 330.

The apparatus according to an aspect of the present disclosure may further include a middle frame 400. The middle frame 400 may be disposed between a rear edge of the vibration member 100 or the display panel and a front edge of the supporting member 300. The middle frame 400 may support one or more edge portions of the vibration member 100 or the display panel and an edge portion of the supporting member 300. The middle frame 400 may enclose one or more of lateral surfaces of each of the vibration member 100 or the display panel and the supporting member 300. The middle frame 400 may configure a gap space GS between the vibration member 100 or the display panel and the supporting member 300. The middle frame 400 may be referred to as a middle cabinet, a middle cover, a middle chassis, a connection member, a frame, a frame member, a middle member, or a side cover member, but the terms are not limited thereto.

The middle frame 400 according to an aspect of the present disclosure may include a first supporting portion 410 and a second supporting portion 430. For example, the first supporting portion 410 may be a supporting portion, but the terms are not limited thereto. For example, the second supporting portion 430 may be a sidewall portion, but the terms are not limited thereto.

The first supporting portion 410 may be disposed between the rear edge of the vibration member 100 or the display panel and the front edge of the supporting member 300, and thus, may provide a gap space GS between the vibration member 100 or the display panel and the supporting member 300. A front surface of the first supporting portion 410 may be coupled to or connected with the rear edge portion of the vibration member 100 or the display panel by a first adhesive member 401. A rear surface of the first supporting portion 410 may be coupled to the front edge of the supporting member 300 by a second adhesive member 403. For example, the first supporting portion 410 may have a single tetragonal picture frame structure, or may include a picture frame structure having a plurality of division bar shapes, but aspects of the present disclosure are not limited thereto.

The second supporting portion 430 may be arranged in parallel with the thickness direction Z of the apparatus. For example, the second supporting portion 430 may be vertically coupled to an outer surface of the first supporting portion 410 in parallel with the thickness direction Z of the apparatus. The second supporting portion 430 may enclose one or more of an outer surface of the vibration member 100 and an outer surface of the supporting member 300, thereby protecting the outer surface of each of the vibration member 100 and the supporting member 300. The first supporting portion 410 may protrude from an inner surface of the second supporting portion 430 to the gap space GS between the vibration member 100 and the supporting member 300.

The apparatus according to an aspect of the present disclosure may include a panel connection member (or a connection member) instead of the middle frame 400.

The panel connection member may be disposed between a rear edge portion of the vibration member 100 and a front edge portion of the supporting member 300, and thus, may configure the gap space GS between the vibration member 100 and the supporting member 300. For example, the panel connection member may be implemented as a double-sided tape, a single-sided tape, or a double-sided adhesive foam pad, but aspects of the present disclosure are not limited thereto. For example, an adhesive layer of the panel connection member may include epoxy, acryl, silicone, or urethane, but aspects of the present disclosure are not limited thereto. For example, the adhesive layer of the panel connection member may include a urethane-based material (or substance) having a relatively ductile characteristic among acryl and urethane, to minimize the transfer of a vibration of the vibration member 100 to the supporting member 300. Accordingly, a vibration of the vibration member 100 transferred to the supporting member 300 may be minimized.

In the apparatus according to an aspect of the present disclosure, when the apparatus includes the panel connection member in place of the middle frame 400, the supporting member 300 may include a bending sidewall which is bent from one side (or an end) of the second supporting member 330 and forms one or more of outer surfaces (or outer sidewalls) of the first supporting member 310, the panel connection member, and the vibration member 100. The bending sidewall according to an aspect of the present disclosure may have a single sidewall structure or a hemming structure. The hemming structure may denote a structure where ends of an arbitrary member is bent in a curved shape to overlap each other, or are separated from each other in parallel. For example, to enhance a sense of beauty in design, the bending sidewall may include a first bending sidewall, which is bent from one side (or an end) of the second supporting member 330, and a second bending sidewall which is bent from the first bending sidewall to a region between the first bending sidewall and the outer surface of the vibration member 100. The second bending sidewall may be separated from an inner surface of the first bending sidewall, to decrease the transfer of an external impact to the outer surface of the vibration member 100 in a lateral direction or a contact between the outer surface of the vibration member 100 and the inner surface of the first bending sidewall. Accordingly, the second bending sidewall may decrease the transfer of the external impact to the outer surface of the vibration member 100 in the lateral direction or a contact between the outer surface of the vibration member 100 and the inner surface of the first bending sidewall.

According to another aspect of the present disclosure, the middle frame 400 may be omitted in the apparatus. The panel connection member or an adhesive may be provided in place of the middle frame 400. According to another aspect of the present disclosure, a partition may be provided instead of the middle frame 400.

Figure 3:
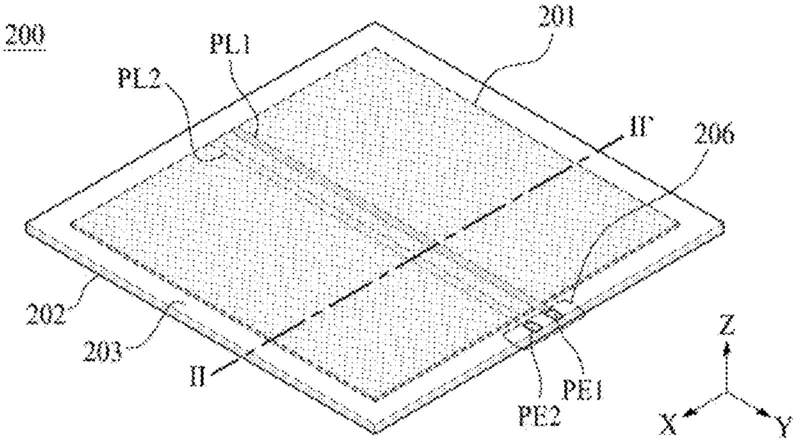
FIG. 3 illustrates a vibration generating apparatus according to an aspect of the present disclosure.
Figure 4:
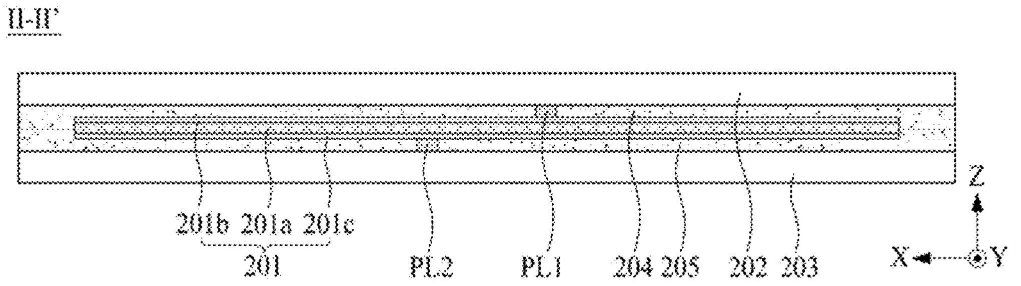
FIG. 4 is a cross-sectional view taken along line II-II' illustrated in FIG. 3.
Figure 5:
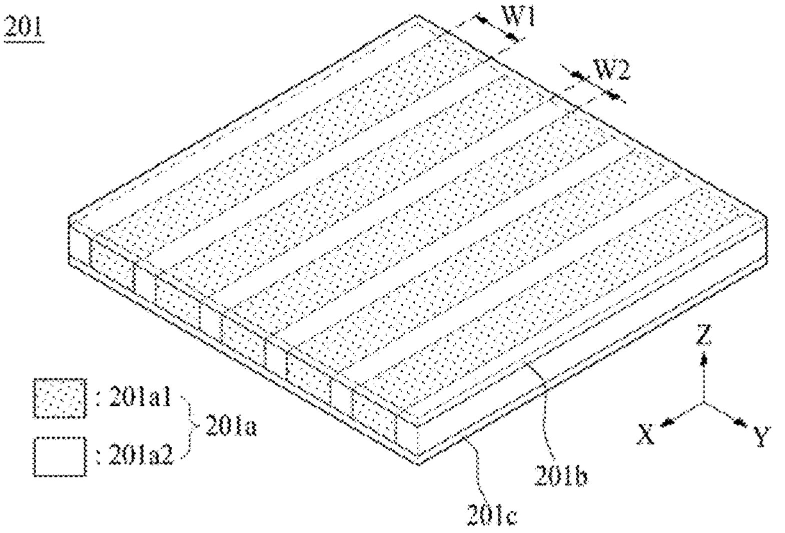
FIG. 5 illustrates a vibration portion illustrated in FIG. 4.

FIG. 3 illustrates a vibration generating apparatus according to an aspect of the present disclosure. FIG. 4 is a cross-sectional view taken along line II-II' illustrated in FIG. 3. FIG. 5 illustrates a vibration portion illustrated in FIG. 4. FIGS. 3 to 5 illustrate the first vibration generating apparatus described above with reference to FIGS. 1 and 2.

Referring to FIGS. 3 to 5, a first vibration generating apparatus 200 according to another aspect of the present disclosure may be referred to as an active vibration member, a vibration apparatus, a flexible vibration apparatus, a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but aspects of the present disclosure are not limited thereto.

The first vibration generating apparatus 200 may include a vibration portion 201. For example, the vibration portion 201 may be a piezoelectric vibration portion or a piezoelectric type vibration portion. The vibration portion 201 may include a vibration layer 201*a*, a first electrode layer 201*b*, and a second electrode layer 201*c*.

The vibration layer 201*a* may include a piezoelectric material (or an electroactive material) having a piezoelectric effect. For example, the piezoelectric material may have a characteristic where pressure or a mechanical force (e.g., a twist) is applied to a crystalline structure based on a potential difference occurs due to dielectric polarization (or poling) caused by a relative position change of a positive (+) ion and a negative (−) ion, and a vibration is generated by an electric field based on a voltage applied thereto. The vibration layer 201*a* may be referred to as the terms such as a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, but the terms are not limited thereto. The vibration layer 201*a* may include a transparent conductive material, a semitransparent conductive material, or an opaque conductive material and may be transparent, semitransparent, or opaque.

The vibration portion 201 according to an aspect of the present disclosure may include a plurality of inorganic material portions and an organic material portion between the plurality of inorganic material portions. For example, the plurality of inorganic material portions may have a piezoelectric characteristic. The plurality of inorganic material portions may include a first portion 201*a*1, and the organic material portion may include a second portion 201*a*2. For example, the vibration layer 201*a* may include a plurality of first portions 201*a*1 and a plurality of second portions 201*a*2. The plurality of first portions 201*a*1 and the plurality of second portions 201*a*2 may be alternately arranged in a first direction X or a second direction Y. For example, the first direction X may be a horizontal direction of the vibration layer 201*a* and the second direction Y may be a vertical direction of the vibration layer 201*a* intersecting with the first direction X, but aspects of the present disclosure are not limited thereto and the first direction X may be a vertical direction of the vibration layer 201*a* and the second direction Y may be a horizontal direction of the vibration layer 201*a*.

Each of the plurality of first portions 201*a*1 may include an inorganic material portion. The inorganic material portion may include a piezoelectric material, a composite piezoelectric material, or an electroactive material, which has a piezoelectric effect, but aspects of the present disclosure are not limited thereto.

Each of the plurality of first portions 201*a*1 may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first portions 201*a*1 may include one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but aspects of the present disclosure are not limited thereto.

In a perovskite crystalline structure, a position of a center ion may be changed by an external stress or a magnetic field to vary polarization (or poling), and a piezoelectric effect may be generated based on the variation of the polarization (or poling). In a perovskite crystalline structure including $PbTiO_3$, a position of a Ti ion corresponding to a center ion may be changed to vary polarization (or poling), and thus, a piezoelectric effect may be generated. For example, in the perovskite crystalline structure, a cubic shape having a symmetric structure may be changed to a tetragonal shape, an orthorhombic shape, and a rhombohedral shape each having an asymmetric structure based on an external stress or a magnetic field, and thus, a piezoelectric effect may be generated. Polarization (or poling) may be high at a morphotropic phase boundary (MPB) of a tetragonal structure and a rhombohedral structure, and polarization (or poling) may be easily realigned, thereby obtaining a high piezoelectric characteristic.

The vibration layer 201*a* or the first portion 201*a*1 according to another aspect of the present disclosure may include one or more of lead (Pb), zirconium (Zr), titanium (Ti), zinc (Zn), nickel (Ni), and niobium (Nb), but aspects of the present disclosure are not limited thereto.

According to another aspect of the present disclosure, the vibration layer 201*a* or the first portion 201*a*1 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but aspects of the present disclosure are not limited thereto. According to another aspect of the present disclosure, the vibration layer 201*a* may include one or more of calcium titanate ($CaTIO_3$), $BaTiO_3$, and $SrTiO_3$, each excluding Pb, but aspects of the present disclosure are not limited thereto.

Each of the plurality of first portions 201*a*1 according to an aspect of the present disclosure may be disposed between two adjacent second portions 201*a*2 of the plurality of second portions 201*a*2, and moreover, may have a first width W1 parallel to the first direction X (or the second direction Y) and may have a length parallel to the second direction Y (or the first direction X). Each of the plurality of second portions 201*a*2 may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 201*a*1 and the second portion 201*a*2 may include a line shape or a stripe shape having the same size or different sizes. Accordingly, the vibration layer 201*a* may have a 2-2 composite structure having a piezoelectric characteristic of a 2-2 vibration mode, and thus, may have a resonance frequency of 20 kHz or less, but aspects of the present disclosure are not limited thereto. For example, the resonance frequency of the vibration layer 201*a* may vary based on one or more of a shape, a length, and a thickness.

In the vibration layer 201*a*, the plurality of first portions 201*a*1 and the plurality of second portions 201*a*2 may be disposed (or arranged) in parallel on the same plane (or the same layer). Each of the plurality of second portions 201*a*2 may be configured to fill a gap between two adjacent first portions 201*a*1, and thus, each of the plurality of second portions 201*a*2 may be connected to or attached on an adjacent first portion 201*a*1. Accordingly, the vibration layer 201*a* may extend by a desired size or length based on lateral coupling (or connection) of the first portion 201*a*1 and the second portion 201*a*2.

In the vibration layer 201*a*, the width W2 of each of the plurality of second portions 201*a*2 may progressively decrease in a direction from a center portion of the vibration layer 201*a* or the first vibration generating apparatus 200 to both edge portions (or both ends) thereof.

According to an aspect of the present disclosure, when the vibration layer 201*a* or the first vibration generating apparatus 200 vibrates in an upward and downward direction Z (or a thickness direction), a second portion 201*a*2 having a largest width W2 among the plurality of second portions 201*a*2 may be disposed at a portion on which a largest stress concentrates. When the vibration layer 201*a* or the first vibration generating apparatus 200 vibrates in the upward and downward direction Z, a second portion 201*a*2 having a smallest width W2 among the plurality of second portions 201_a_2 may be disposed at a portion where a relatively smallest stress occurs. For example, the second portion 201_a_2 having the largest width W2 among the plurality of second portions 201_a_2 may be disposed at a center portion of the vibration layer 201_a_, and the second portion 201_a_2 having the smallest width W2 among the plurality of second portions 201_a_2 may be disposed at both edge portions of the vibration layer 201_a_. Accordingly, when the vibration layer 201_a_ or the first vibration generating apparatus 200 vibrates in the upward and downward direction Z, an overlap of a resonance frequency or interference of a sound wave generated in a portion on which a largest stress concentrates may be minimized, and thus, the dipping of a sound pressure level generated in a low-frequency band may decrease and the flatness of a sound characteristic of the low-frequency band may be improved. For example, the flatness of a sound characteristic may be a magnitude of a deviation between a highest sound pressure level and a lowest sound pressure level In the vibration layer 201_a_, the plurality of first portions 201_a_1 may have different sizes (or widths). For example, a size (or a width) of each of the plurality of first portions 201_a_1 may decrease or increase progressively in a direction from the center portion of the vibration layer 201_a_ or the first vibration generating apparatus 200 to both edge portions (or both ends) thereof. Therefore, a sound pressure level characteristic of a sound of the vibration layer 201_a_ may be enhanced by various unique vibration frequencies based on vibrations of the plurality of first portions 201_a_1 having different sizes, and a frequency band may be extended.

Each of the plurality of second portions 201_a_2 may be disposed between the plurality of first portions 201_a_1. Therefore, in the vibration layer 201_a_ of the first vibration generating apparatus 200, vibration energy based on a link in a unit lattice of the first portion 201_a_1 may be increased by the second portion 201_a_2 to improve a vibration characteristic and a piezoelectric characteristic and flexibility may be secured. For example, the second portion 201_a_2 may include one of an epoxy-based polymer, an acrylic-based polymer, and a silicone-based polymer, but aspects of the present disclosure are not limited thereto.

Each of the plurality of second portions 201_a_2 according to an aspect of the present disclosure may include an organic material portion. For example, each of the organic material portions may be disposed between two adjacent inorganic material portions and may absorb an impact applied to a corresponding inorganic material portion (or a first portion), release a stress concentrating on the inorganic material portion to enhance the durability of the vibration layer 201_a_ or the first vibration generating apparatus 200, and provide flexibility to the vibration layer 201_a_ or the first vibration generating apparatus 200. Accordingly, the first vibration generating apparatus 200 may be configured to have flexibility.

The second portion 201_a_2 according to an aspect may have modulus (or young's modulus) and viscoelasticity which are lower than those of the first portion 201_a_1, and thus, may enhance the reliability of the first portion 201_a_1 which is vulnerable to an impact due to a fragile characteristic thereof. For example, the second portion 201_a_2 may include a material which has a loss coefficient of 0.01 to 1 and a modulus of 0.1 Gpa to 10 Gpa (Gigapascal).

The organic material portion included in the second portion 201_a_2 may include an organic material, an organic polymer, an organic piezoelectric material, or an organic non-piezoelectric material having a flexible characteristic compared to the inorganic material portion of the first portion 201_a_1. For example, the second portion 201_a_2 may be referred to as an adhesive portion, a flexible portion, a bending portion, a damping portion, or a ductile portion, or the like, but aspects of the present disclosure are not limited thereto.

The plurality of first portions 201_a_1 and the plurality of second portions 201_a_2 may be disposed on (or connected to) the same plane, and thus, the vibration layer 201_a_ according to an aspect of the present aspect may have a single thin film form. For example, the vibration layer 201_a_ may comprises the plurality of first portions 201_a_1 connected to one side thereof. For example, the vibration layer 201_a_ may comprises the plurality of first portions 201_a_1 connected to the vibration layer 201_a_. For example, the vibration layer 201_a_ may be vibrated in a vertical direction by the first portion 201_a_1 having a vibration characteristic and may be bent in a curved shape by the second portion 201_a_2 having flexibility. Also, in the vibration layer 201_a_ according to an aspect of the present disclosure, a size of the first portion 201_a_1 and a size of the second portion 201_a_2 may be adjusted based on a piezoelectric characteristic and flexibility needed for the vibration layer 201_a_ or the vibration generating apparatus 200. For example, in the vibration layer 201_a_ requiring a piezoelectric characteristic rather than flexibility, a size of the first portion 201_a_1 may be adjusted to be greater than that of the second portion 201_a_2. In another aspect of the present disclosure, in the vibration layer 201_a_ requiring flexibility rather than a piezoelectric characteristic, a size of the second portion 201_a_2 may be adjusted to be greater than that of the first portion 201_a_1. Accordingly, a size of the vibration layer 201_a_ may be adjusted based on a desired characteristic, and thus, the vibration layer 201_a_ may be easily designed.

The first electrode layer 201_b_ may be disposed on a first surface (e.g., an upper surface) of the vibration layer 201_a_. The first electrode layer 201_b_ may be disposed at or coupled (or connected) to a first surface of each of the plurality of first portions 201_a_1 and a first surface of each of the plurality of second portions 201_a_2 and may be electrically connected with the first surface of each of the plurality of first portions 201_a_1. For example, the first electrode layer 201_b_ may have a single electrode (or one electrode) shape disposed at the whole first surface of the vibration layer 201_a_. The first electrode layer 201_b_ may have substantially the same shape as the vibration layer 201_a_, but aspects of the present disclosure are not limited thereto.

The second electrode layer 201_c_ may be disposed on a second surface (or a rear surface), which is different from (or opposite to) the first surface, of the vibration layer 201_a_. The second electrode layer 201_c_ may be disposed at or coupled (or connected) to a second surface of each of the plurality of first portions 201_a_1 and a second surface of each of the plurality of second portions 201_a_2 and may be electrically connected with the second surface of each of the plurality of first portions 201_a_1. For example, the second electrode layer 201_c_ may have a single electrode (or one electrode) shape disposed at the whole second surface of the vibration layer 201_a_. The second electrode layer 201_c_ may have substantially the same shape as that of the vibration layer 201_a_, but aspects of the present disclosure are not limited thereto.

One or more of the first electrode layer 201_b_ and the second electrode layer 201_c_ according to an aspect of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but aspects of the present disclosure are not limited thereto. Examples of the opaque conductive material may include aluminum (Al), copper (Cu), gold (Au), silver (Ag), molybdenum (Mo), and Mg or an alloy thereof, but aspects of the present disclosure are not limited thereto.

The vibration layer 201*a* may be polarized based on a voltage applied to the first electrode layer 201*b* and the second electrode layer 201*c* at a certain temperature, but aspects of the present disclosure are not limited thereto. For example, the vibration layer 201*a* may alternately contracting and/or expanding according to an inverse piezoelectric effect based on a sound signal (or a voice signal or a vibration driving signal) that is applied from an outside source to the first electrode layer 201*b* and the second electrode layer 201*c*. For example, the vibration layer 201*a* may be caused to vibrate in a vertical-direction vibration and a horizontal-direction based on the sound signal applied to the first electrode layer 201*b* and the second electrode layer 201*c*. The vibration layer 201*a* may increase a displacement of a vibration member, based on contraction and/or expansion in a horizontal direction, thereby more enhancing a vibration of the vibration member.

The first vibration generating apparatus 200 according to an aspect of the present disclosure may further include a first cover member 202 and a second cover member 203.

The first cover member 202 may be disposed on a first surface of the vibration portion 201. For example, the first cover member 202 may be configured to cover the first electrode layer 201*b*. Accordingly, the first cover member 202 may protect the first electrode layer 201*b*.

The second cover member 203 may be disposed on a second surface of the vibration portion 201. For example, the second cover member 203 may be configured to cover the second electrode layer 201*c*. Accordingly, the second cover member 203 may protect the second electrode layer 201*c*.

Each of the first cover member 202 and the second cover member 203 according to an aspect of the present disclosure may include one or more materials of plastic, fiber, and wood, but aspects of the present disclosure are not limited thereto. For example, the first cover member 202 and the second cover member 203 may include the same material or different materials. For example, the first cover member 202 and the second cover member 203 may be a polyimide film or a polyethylene terephthalate film, but aspects of the present disclosure are not limited thereto.

The first cover member 202 according to an aspect of the present disclosure may be connected or coupled to the first electrode layer 201*b* based on a first adhesive layer 204. For example, the first cover member 202 may be connected or coupled to the first electrode layer 201*b* through a film laminating process using the first adhesive layer 204.

A second cover member 203 according to an aspect of the present disclosure may be connected with or coupled to the second electrode layer 201*c* based on a second adhesive layer 205. For example, the second cover member 203 may be connected with or coupled to the second electrode layer 201*c* by a film laminating process using the second adhesive layer 205. For example, the vibration apparatus 200 may be implemented as one film by using the first cover member 202 and the second cover member 203.

The first adhesive layer 204 may be disposed between the first electrode layer 201*b* and the first cover member 202. The second adhesive layer 205 may be disposed between the second electrode layer 201*c* and the second cover member 203. For example, the first adhesive layer 204 and the second adhesive layer 205 may be provided between the first cover member 202 and the second cover member 203 to encapsulate the vibration layer 201*a*, the first electrode layer 201*b*, and the second electrode layer 201*c*. For example, the first adhesive layer 204 and the second adhesive layer 205 may be provided between the first cover member 202 and the second cover member 203 to fully surround the vibration layer 201*a*, the first electrode layer 201*b*, and the second electrode layer 201*c*. For example, the vibration layer 201*a*, the first electrode layer 201*b*, and the second electrode layer 201*c* may be buried or embedded between the first adhesive layer 204 and the second adhesive layer 205.

Each of the first adhesive layer 204 and the second adhesive layer 205, according to an aspect of the present disclosure, may include an electrical insulation material having adhesive properties and is capable of compression and decompression. For example, each of the first adhesive layer 204 and the second adhesive layer 205 may include one of an epoxy resin, acrylic resin, silicone resin, and urethane resin, but aspects of the present disclosure are not limited thereto.

The first vibration generating apparatus 200 according to an aspect of the present disclosure may further include a first power supply line PL1 disposed in the first cover member 202, a second power supply line PL2 disposed in the second cover member 203, and a pad portion 206 electrically connected with the first power supply line PL1 and the second power supply line PL2. The pad portion 206 may include a first pad electrode PE1 (or a first signal terminal) electrically connected with the first power supply line PL1 and a second pad electrode PE2 (or a second signal terminal) electrically connected with the second power supply line PL2.

The first power supply line PL1 may be disposed between the first electrode layer 201*b* and the first cover member 202 and may be electrically connected to the first electrode layer 201*b*. The first power supply line PL1 may extend long in a second direction Y and may be electrically connected to a center portion of the first electrode layer 201*b*. In an aspect, the first power supply line PL1 may be electrically connected to the first electrode layer 201*b* based on an anisotropic conductive film. In another aspect, the first power supply line PL1 may be electrically connected to the first electrode layer 201*b* through a conductive material (or particles) included in the first adhesive layer 204.

The second power supply line PL2 may be disposed between the second electrode layer 201*c* and the second cover member 203 and may be electrically connected to the second electrode layer 201*c*. The second power supply line PL2 may extend long in the second direction Y and may be electrically connected to a center portion of the second electrode layer 201*c*. In an aspect, the second power supply line PL2 may be electrically connected to the second electrode layer 201*c* by using an anisotropic conductive film. In another aspect, the second power supply line PL2 may be electrically connected to the second electrode layer 201*c* through a conductive material (or particles) included in the second adhesive layer 205.

According to an aspect of the present disclosure, a first power supply line PL1 and a second power supply line PL2 may be disposed not to overlap each other. In some aspects, the first power supply line PL1 is disposed not to overlap the second power supply line PL2 to prevent a short circuit defect between the first power supply line PL1 and the second power supply line PL2.

The pad portion 206 may be provided at one edge portion of one of the first cover member 202 and the second cover member 203 to be electrically connected to one side (or one end) of each of the first power supply line PL1 and the second power supply line PL2.

The pad portion 206 according to an aspect of the present disclosure may include a first pad electrode PE1 electrically connected with one end of the first power supply line PL1 and a second pad electrode PE2 electrically connected with one end of the second power supply line PL2.

The first pad electrode PE1 may be disposed at one edge portion of one of the first cover member 202 and the second cover member 203 and may be connected with one end of the first power supply line PL1. For example, the first pad electrode PE1 may pass through one of the first cover member 202 and the second cover member 203 and may be electrically connected with one end of the first power supply line PL1. For example, the first pad electrode PE1 may be provided as one body (or a single body) with the first power supply line PL1. The first pad electrode PE1 may be a portion which is exposed as the first power supply line PL1 passes through one of the first cover member 202 and the second cover member 203.

The second pad electrode PE2 may be arranged in parallel with the first pad electrode PE1 and may be connected with one end of the second power supply line PL2. For example, the second pad electrode PE2 may pass through one of the first cover member 202 and the second cover member 203 and may be electrically connected with one end of the second power supply line PL2. For example, the second pad electrode PE2 may be provided as one body (or a single body) with the second power supply line PL2. The second pad electrode PE2 may be a portion which is exposed as the second power supply line PL2 passes through one of the first cover member 202 and the second cover member 203.

According to an aspect of the present disclosure, each of the first power supply line PL1, the second power supply line PL2, the first pad electrode PE1, the second pad electrode PE2, and the pad portion 206 may be configured to be transparent, semitransparent, or opaque.

A pad portion 206 according to an aspect of the present disclosure may be electrically connected with a signal cable (or a signal connection member).

The signal cable (or a signal connection member) may be electrically connected with the pad portion 206 and may supply the first vibration generating apparatus 200 with a vibration driving signal (e.g., a sound signal or a voice signal) provided from a sound processing circuit. The signal cable according to an aspect of the present disclosure may include a first terminal electrically connected with a first pad electrode of the pad portion 206 and a second terminal electrically connected with a second pad electrode of the pad portion 206. For example, the signal cable may be configured as a flexible printed circuit cable, a flexible flat cable, a single-sided flexible printed circuit, a single-sided flexible PCB, a flexible multi-layer printed circuit, or a flexible multi-layer PCB, but aspects of the present disclosure are not limited thereto.

The signal cable according to an aspect of the present disclosure may be electrically connected with one of the first pad electrode PE1 and the second pad electrode PE2 of the first vibration generating apparatus 200 and may supply one of a first-polarity vibration driving signal and a second-polarity vibration driving signal supplied from the sound processing circuit. For example, the signal cable may include one of a first terminal for supplying a positive (+) (or first-polarity) vibration driving signal and a second terminal for supplying a negative (−) (or second-polarity) vibration driving signal. For example, the signal cable may include only the first terminal for supplying the positive (+) (or first-polarity) vibration driving signal, or may include only the second terminal for supplying the negative (−) (or second-polarity) vibration driving signal. For example, the first terminal of the signal cable may be electrically connected with the first pad electrode PE1 of the first vibration generating apparatus 200 and may supply the first vibration generating apparatus 200 with only the positive (+) (or first-polarity) vibration driving signal supplied from the sound processing circuit. Alternatively, the second terminal of the signal cable may be electrically connected with the second pad electrode PE2 of the first vibration generating apparatus 200 and may supply the first vibration generating apparatus 200 with only the negative (−) (or second-polarity) vibration driving signal supplied from the sound processing circuit. According to an aspect of the present disclosure, the signal cable may provide a single signal path and may be configured to include only one of the first terminal and the second terminal.

The sound processing circuit may generate an AC vibration driving signal including a first vibration driving signal and a second vibration driving signal based on sound data provided from an external sound data generating circuit. The first vibration driving signal may be one of the positive (+) vibration driving signal and the negative (−) vibration driving signal, and the second vibration driving signal may be one of the positive (+) vibration driving signal and the negative (−) vibration driving signal. For example, the first vibration driving signal may be supplied to a first electrode layer 201*b* through the first terminal of the signal cable, the first pad electrode PE1 of the pad portion 206, and the first power supply line PL1. The second vibration driving signal may be supplied to a second electrode layer 201*c* through the second terminal of the signal cable, the second pad electrode PE2 of the pad portion 206, and the second power supply line PL2. According to an aspect of the present disclosure, only one of the first vibration driving signal and the second vibration driving signal may be supplied to the first vibration generating apparatus 200. For example, the first vibration generating apparatus 200 may be electrically connected with the first terminal of the signal cable and the first pad electrode PE1 and may be supplied with only the first vibration driving signal, and may not be supplied with the second driving signal. Alternatively, the first vibration generating apparatus 200 may be electrically connected with the second terminal of the signal cable and the second pad electrode PE2 and may be supplied with the second vibration driving signal, and may not be supplied with the first driving signal.

The first vibration generating apparatus 200 according to an aspect of the present disclosure may be implemented as a thin film as the first portion 201*a*1 having a piezoelectric characteristic and the second portion 201*a*2 having flexibility are alternately and repeatedly connected with each other. Therefore, a vibration width (or a displacement width) of the first vibration generating apparatus 200 may increase based on the second portion 201*a*2 having flexibility. Accordingly, a sound characteristic and/or a sound pressure level characteristic of a low-frequency band generated based on a vibration of the vibration member may be enhanced.

Figure 6:
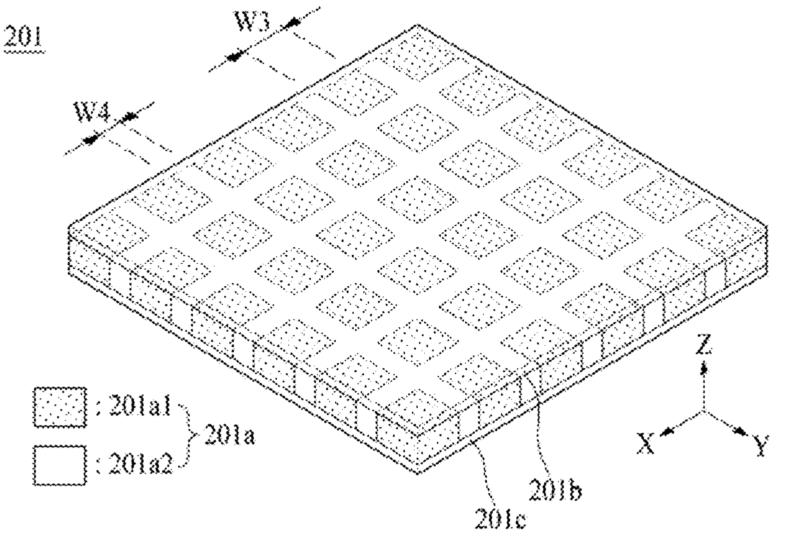
FIGS. 6 to 8 illustrate another aspect of the vibration portion illustrated in FIG. 5.
Figure 7:
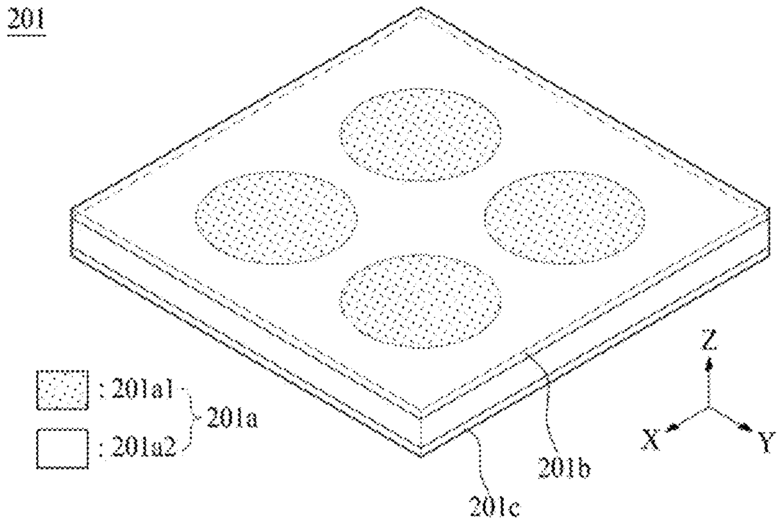
Figure 8:
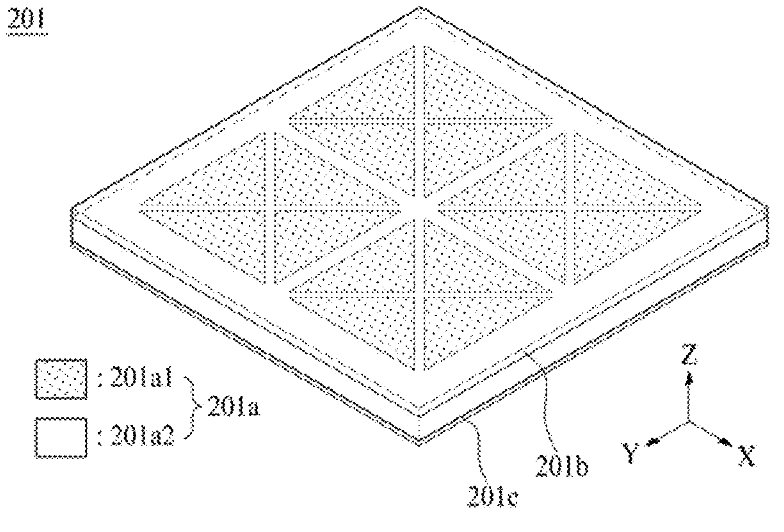

FIGS. 6 to 8 illustrate another aspect of the vibration portion illustrated in FIG. 5.

With reference to FIG. 6, a vibration layer 201*a* of a vibration portion 201 according to another aspect of the present disclosure may include a plurality of first portions 201*a*1, which are separated from one another in a first direction X and a second direction Y, and a second portion 201*a*2 disposed between the plurality of first portions 201*a*1.

The plurality of first portions 201*a*1 may be separated from one another in each of the first direction X and the second direction Y. For example, the plurality of first portions 201*a*1 may be arranged in a lattice form to have a hexahedral shape having the same size. Each of the plurality of first portions 201*a*1 may include substantially the same piezoelectric material as that of the first portion 201*a*1 described above with reference to FIGS. 3 to 5, and thus, like reference numerals refer to like elements and repeated descriptions thereof are omitted.

The second portion 201*a*2 may be arranged between the plurality of first portions 201*a*1 in each of the first direction X and the second direction Y. The second portion 201*a*2 may be configured to fill a gap between two adjacent first portions 201*a*1 or surround each of the plurality of first portions 201*a*1, and thus, may be connected or adhered to an adjacent first portion 201*a*1. According to an aspect of the present disclosure, a width of the second portion 201*a*2 disposed between two first portions 201*a*1 adjacent to each other in the first direction X may be the same as or different from that of the first portion 201*a*1, and a width of the second portion 201*a*2 disposed between two first portions 201*a*1 adjacent to each other in the second direction Y may be the same as or different from that of the first portion 201*a*1. The second portion 201*a*2 may include substantially the same piezoelectric material as that of the second portion 201*a*2 described above with reference to FIGS. 3 to 5, and thus, like reference numerals refer to like elements and repeated descriptions thereof are omitted.

The vibration layer 201*a* according to another aspect of the present disclosure may have a 1-3 composite structure having a piezoelectric characteristic of a 1-3 vibration mode, and thus, may have a resonance frequency of 30 MHz or less, but aspects of the present disclosure are not limited thereto. For example, the resonance frequency of the vibration layer 201*a* may vary based on one or more of a shape, a length, and a thickness.

With reference to FIG. 7, a vibration layer 201*a* of a vibration portion 201 according to another aspect of the present disclosure may include a plurality of first portions 201*a*1, which are separated from one another in a first direction X and a second direction Y, and a second portion 201*a*2 disposed between the plurality of first portions 201*a*1.

Each of the plurality of first portions 201*a*1 may have a circular-shaped planar structure. For example, each of the plurality of first portions 201*a*1 may have a circular plate shape, but aspects of the present disclosure are not limited thereto. For example, each of the plurality of first portions 201*a*1 may have a dot shape such as an oval shape, a polygonal shape, or a donut shape. Each of the plurality of first portions 201*a*1 may include substantially the same piezoelectric material as that of the first portion 201*a*1 described above with reference to FIGS. 3 to 5, and thus, like reference numerals refer to like elements and repeated descriptions thereof are omitted.

The second portion 201*a*2 may be arranged between the plurality of first portions 201*a*1 in each of the first direction X and the second direction Y. The second portion 201*a*2 may be configured to surround each of the plurality of first portions 201*a*1, and thus, may be connected or adhered to a lateral surface of each of the plurality of first portions 201*a*1. Each of the plurality of first portions 201*a*1 and the second portion 201*a*2 may be disposed (or arranged) in parallel on the same plane (or the same layer). The second portion 201*a*2 may include substantially the same organic material as that of the second portion 201*a*2 described above with reference to FIGS. 3 to 5, and thus, like reference numerals refer to like elements and repeated descriptions thereof are omitted.

With reference to FIG. 8, a vibration layer 201*a* of a vibration portion 201 according to another aspect of the present disclosure may include a plurality of first portions 201*a*1, which are separated from one another in a first direction X and a second direction Y, and a second portion 201*a*2 disposed between the plurality of first portions 201*a*1.

Each of the plurality of first portions 201*a*1 may have a triangular-shaped planar structure. For example, each of the plurality of first portions 201*a*1 may have a triangular plate shape. Each of the plurality of first portions 201*a*1 may include substantially the same piezoelectric material as that of the first portion 201*a*1 described above with reference to FIGS. 3 to 5, and thus, like reference numerals refer to like elements and repeated descriptions thereof are omitted.

According to an aspect of the present disclosure, four adjacent first portions 201*a*1 of the plurality of first portions 201*a*1 may be arranged adjacent to one another to form a tetragonal shape (or a square shape). A vertex of each of the four adjacent first portions 201*a*1 forming a tetragonal shape may be disposed adjacent to a center portion (or a middle portion) of a tetragonal shape.

The second portion 201*a*2 may be arranged between the plurality of first portions 201*a*1 in each of the first direction X and the second direction Y. The second portion 201*a*2 may be configured to surround each of the plurality of first portions 201*a*1, and thus, may be connected or adhered to a lateral surface of each of the plurality of first portions 201*a*1. Each of the plurality of first portions 201*a*1 and the second portion 201*a*2 may be disposed (or arranged) in parallel on the same plane (or the same layer). The second portion 201*a*2 may include substantially the same organic material as that of the second portion 201*a*2 described above with reference to FIGS. 3 to 5, and thus, like reference numerals refer to like elements and repeated descriptions thereof are omitted.

According to another aspect of the present disclosure, 2N (where N is a natural number of 2 or more) of adjacent first portions 201*a*1 among a plurality of first portions 201*a*1 having a triangular shape may be arranged adjacent to one another to form a 2N-angular shape. For example, six adjacent first portions 201*a*1 among the plurality of first portions 201*a*1 may be arranged adjacent to one another to form a hexagonal shape (or a regular hexagon). A vertex of each of six adjacent first portions 201*a*1 having a hexagonal shape may be disposed adjacent to a center portion (or a regular center portion) of a hexagonal shape. The second portion 201*a*2 may be provided to surround each of the plurality of first portions 201*a*1, and thus, may be connected with or attached on a lateral surface of each of the plurality of first portions 201*a*1. The plurality of first portions 201*a*1 and the second portion 201*a*2 may be disposed (or arranged) in parallel on the same plane (or the same layer).

Figure 9:
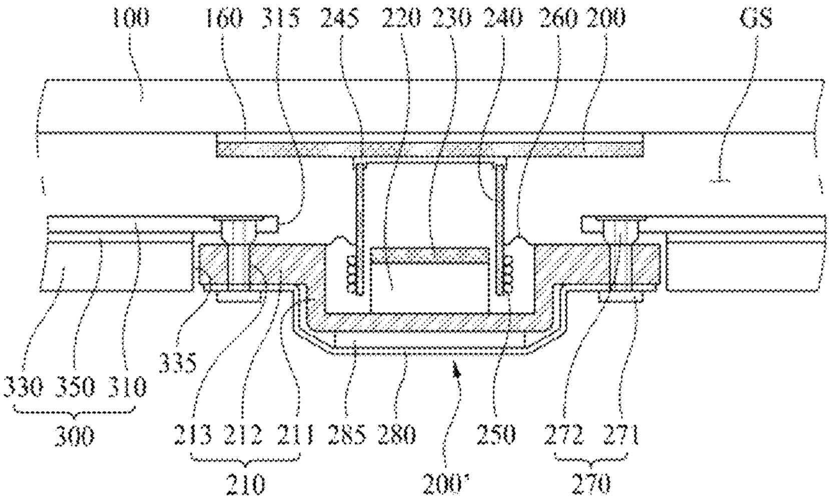
FIG. 9 illustrates a vibration generating apparatus according to an aspect of the present disclosure.
Figure 10:
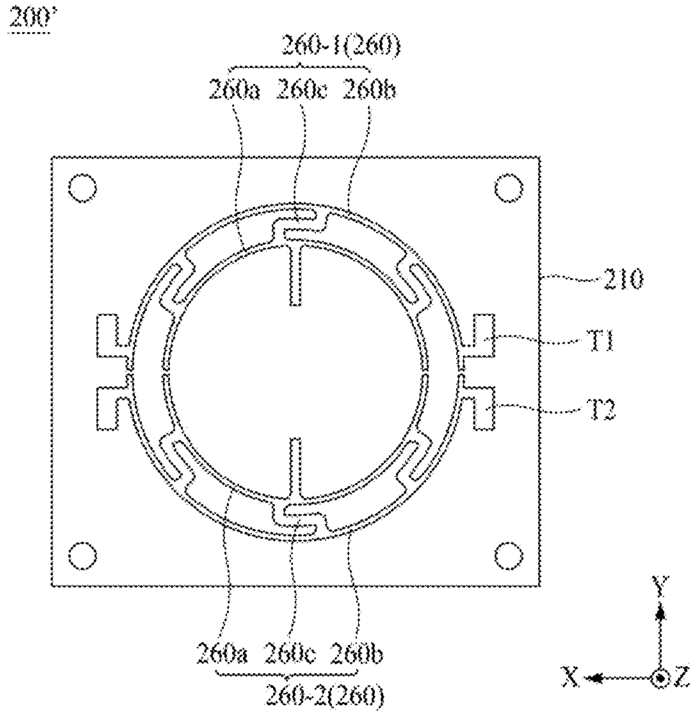
FIG. 10 illustrates a damper structure of a vibration generating apparatus according to an aspect of the present disclosure.

FIG. 9 illustrates a vibration generating apparatus according to an aspect of the present disclosure. FIG. 10 illustrates a damper structure of a vibration generating apparatus according to an aspect of the present disclosure.

Referring to FIGS. 9 and 10, a vibration apparatus 200 and 200' according to an aspect of the present disclosure may include a first vibration generating apparatus 200 and a second vibration generating apparatus 200'.

The first vibration generating apparatus 200 may be disposed at a rear surface of a vibration member 100. The first vibration generating apparatus 200 may be connected with or coupled to the rear surface of the vibration member 100 by a connection member 160. The first vibration generating apparatus 200 may be implemented as a film type which is connected with or coupled to the rear surface of the vibration member 100 by the connection member 160.

The first vibration generating apparatus 200 may be referred to as a first sound generating module, a first sound generating apparatus, a first vibration generating apparatus, a first displacement apparatus, a first sound apparatus, a piezoelectric type vibration apparatus, a film actuator, a film type piezoelectric composite actuator, a film speaker, a film type piezoelectric speaker, or a film type piezoelectric composite speaker, which uses a piezoelectric device having a piezoelectric characteristic, but the terms are not limited thereto.

The connection member 160 may be disposed between the first vibration generating apparatus 200 and the vibration member 100 and may connect or couple the first vibration generating apparatus 200 to a vibration member 100. For example, the first vibration generating apparatus 200 may be connected with or coupled to the rear surface of the vibration member 100 by the connection member 160, and thus, may be supported by or disposed at the rear surface of the vibration member 100.

The second vibration generating apparatus 200' may be disposed between the vibration member 100 and a supporting member 300. The second vibration generating apparatus 200' may be adjacent to or contact a rear surface of the first vibration generating apparatus 200. The second vibration generating apparatus 200' may include a frame 210, a magnet 220, a center pole 230, a bobbin 240, and a coil 250.

A frame 210 may be configured to be fixed to a supporting member 300. The frame 210 may be fixed (or supported) to through holes 315 and 335 of the supporting member 300. For example, the frame 210 may be configured to have a size which is greater than that of a first through hole 315 of the supporting member 300 and less than that of a second through hole 335 of the supporting member 300, but aspects of the present disclosure are not limited thereto.

The frame 210 may be fixed to or supported by the supporting member 300 by using a fixing member 270. For example, the frame 210 may be coupled (or fixed) to a first supporting member 310 of the supporting member 300 by the fixing member 270. For example, the frame 210 may be coupled (or fixed) to a portion, exposed by the second through hole 335 of the supporting member 300, of the first supporting member 310 by using the fixing member 270.

The fixing member 270 may include a screw 271 and a nut 272. The nut 272 of the fixing member 270 may be fixed to the supporting member 300. For example, the nut 272 may be coupled (or fixed) to a portion, exposed by the second through hole 335 of the supporting member 300, of the first supporting member 310. The screw 271 may be fastened to the nut 272 through the frame 210, and thus, may couple the frame 210 to the supporting member 300. Therefore, the frame 210 may be inserted (or accommodated) into the second through hole 335 of the supporting member 300. For example, the nut 272 may be a self-clinching nut. For example, the self-clinching nut may be a PEM® nut, but aspects of the present disclosure are not limited thereto.

The frame 210 may include a material having thermal conductivity. For example, the frame 210 may include a metal material. For example, the frame 210 may include a material such as iron (Fe), but aspects of the present disclosure are not limited thereto. The frame 210 may be a yoke, but aspects of the present disclosure are not limited thereto.

The frame 210 may be configured to support or accommodate (or receive) a magnet 220. For example, the frame 210 may be configured to include an accommodating space (or an internal space) having a certain depth. The magnet 220 may be accommodated into the accommodating space of the frame 210, and the accommodating space may also accommodate a bobbin 240 and a coil 250 wrapped around the bobbin 240.

The frame 210 according to an aspect of the present disclosure may include a first frame 211 and a second frame 212. The frame 212 may also include holes 213 for accommodating a fixing member 270 that fastens the second frame 212 to the first supporting member 310 or the second supporting member 330.

The first frame 211 may support or accommodate (or receive) the magnet 220. For example, the first frame 211 may be configured to include an accommodating space (or an internal space) having a certain depth. For example, the first frame 211 may include a bottom portion (or a bottom frame) and a sidewall portion (or a sidewall frame) connected with an edge portion of the bottom portion. For example, the sidewall portion may be bent from an edge portion of the bottom portion and may define an accommodating space on the bottom portion. For example, the first frame 211 may be configured to include a cross-sectional surface having a U-shape, but aspects of the present disclosure are not limited thereto. For example, the first frame 211 may have a size which is less than that of the first through hole 315 of the supporting member 300. For example, the first frame 211 may be configured to have a circular shape, an oval shape, or a polygonal (for example, tetragonal) shape. For example, the first frame 211 may include a cylinder shape having a circular shape, an oval shape, or a polygonal (for example, tetragonal) shape.

The second frame 212 may be provided on at least one lateral surface (or one sidewall) of the first frame 211. The second frame 212 may be inserted into the second through hole 335 of the supporting member 300. A size of the second frame 212 may be less than that of the second through hole 335 of the supporting member 300 and greater than that of the first through hole 315 of the supporting member 300.

According to an aspect of the present disclosure, the second frame 212 may extend or protrude from a whole lateral surface of the first frame 211 to surround the first frame 211. For example, the second frame 212 may be connected (or provided as one body) with an upper lateral surface of the first frame 211 to have a shape which is the same as or different from that of the first frame 211. For example, the second frame 212 may have a ring shape, a band shape, or a polygonal (for example, tetragonal) shape connected with the upper lateral surface of the first frame 211.

According to another aspect of the present disclosure, the second frame 212 may include two or more protrusion portions (or extension portions) protruding (or extending) from one lateral surface (or one sidewall) of the first frame 211 to surround the first frame 211. The two or more protrusion portions may have a symmetrical structure with respect to a center portion of the frame 210.

The second frame 212 may be fixed (or supported) to the supporting member 300 by the fixing member 270. For example, the second frame 212 may be fixed (or supported) to the first supporting member 310 of the supporting member 300 by the fixing member 270. For example, the second frame 212 may be inserted into the second through hole 335 of the supporting member 300 and may be coupled (or fixed)

to a portion of the first supporting member 310 exposed through the second through hole 335 by using the fixing member 270.

The nut 272 of the fixing member 270 may be inserted into and fixed to the first supporting member 310 of the supporting member 300 and may be inserted into the second frame 212 of the frame 210. For example, the nut 272 may be a self-clinching nut. For example, the self-clinching nut may be a PEM® nut, but aspects of the present disclosure are not limited thereto. The screw 271 (or a bolt) may be fastened to the nut 272, and thus, may couple (or fix) the second frame 212 to the first supporting member 310 of the supporting member 300. A head of the screw 271 may have a size which is greater than that of the nut 272 and may contact a rear surface of the second frame 212.

The second vibration generating apparatus 200' according to an aspect of the present disclosure may further include a frame cover 280 which covers a rear surface of the frame 210.

The frame cover 280 may be configured to surround the rear surface of the frame 210. For example, the frame cover 280 may be provided to surround the rear surface of the frame 210 and may dissipate heat occurring in driving of the second vibration generating apparatus 200'. The frame cover 280 may be provided to surround a rear surface of the first frame 211 and a rear surface of the second frame 212 of the frame 210. For example, the frame cover 280 may include a metal material, having high thermal conductivity, such as aluminum (Al), copper (Cu), silver (Ag), or magnesium (Mg), or an alloy thereof, but aspects of the present disclosure are not limited thereto.

A heat dissipation member 285 may be disposed at an inner surface of the frame cover 280. The heat dissipation member 285 may be disposed between the frame cover 280 and the rear surface of the frame 210. The heat dissipation member 285 may be disposed between the frame cover 280 and the rear surface of the first frame 211. For example, the heat dissipation member 285 may include a metal material, having high thermal conductivity, such as aluminum (Al), copper (Cu), silver (Ag), or magnesium (Mg), or an alloy thereof, but aspects of the present disclosure are not limited thereto.

The magnet 220 may be disposed at the frame 210. For example, the magnet 220 may be disposed at the first frame 211 of the frame 210. The magnet 220 may be surrounded by the first frame 211. For example, the magnet 220 may be disposed in or accommodated into an accommodating space of the first frame 211. For example, the magnet 220 may have a a circular shape, an oval shape, or a polygonal (for example, tetragonal) shape.

The magnet 220 may be provided as a permanent magnet. The magnet 220 may be a sintered magnet such as barium ferrite, and a material of the magnet 220 may include one or more of $Fe_2O_3$, $BaCO_3$, a neodymium magnet, strontium ferrite ($Fe_{12}O_{19}Sr$) with improved magnet component, an alloy cast magnet including Al, nickel (Ni), and cobalt (Co), but aspects of the present disclosure are not limited thereto. For example, the neodymium magnet may be neodymium-iron-boron (Nd—Fe—B).

The bobbin 240 may be disposed (or provided) to surround a periphery of the magnet 220. For example, the bobbin 240 may be disposed (or accommodated) in an accommodating space of the frame 210 to surround the periphery of the magnet 220. For example, a lower portion of the bobbin 240 may be disposed (or accommodated) in the accommodating space of the frame 210 to surround the periphery of the magnet 220.

The bobbin 240 may be adjacent to or contact a rear surface of the first vibration generating apparatus 200. Alternatively, the bobbin 240 may be adjacent to or contact a rear surface of the vibration member 100. For example, the bobbin 240 may be coupled (or connected) to the rear surface of the first vibration generating apparatus 200. The bobbin 240 may be coupled (or connected) to the rear surface of the first vibration generating apparatus 200 with a coupling member. Alternatively, the bobbin 240 may be coupled (or connected) to the rear surface of the vibration member 100 by using the coupling member. The coupling member may include a double-sided tape or a conductive double-sided tape. For example, the coupling member may be configured with a double-sided tape instead of resin, and thus, a rework for correcting an adhesive (or attachment) position between the bobbin 240 and the first vibration generating apparatus 200 or the vibration member 100, a rework of replacing the second vibration generating apparatus 200', or and a desired rework may be easily performed. According to an aspect of the present disclosure, the bobbin 240 and the first vibration generating apparatus 200 or the vibration member 100 may be coupled to each other by a double-sided tape, and thus, the difficulty of a manufacturing process caused by the use of resin may be reduced.

The bobbin 240 may include a circular shape, an oval shape, or a polygonal (for example, tetragonal) shape including a hollow portion. The hollow portion of the bobbin 240 may have a size which is greater than that of the magnet 220. Accordingly, the magnet 220 may be inserted into the bobbin 240, or the bobbin 240 may be disposed to surround the periphery of the magnet 220.

The bobbin 240 may include a material through which a magnet flux passes and which is low in thermal conductivity. For example, the bobbin 240 may be implemented as a ring-shaped (or cylindrical or oval) structure material which includes a material obtained by processing pulp or paper, aluminum (Al), magnesium (Mg), an Al alloy, a Mg alloy, synthetic resin such as polypropylene, or polyamide-based fiber.

The coil 250 may be wound to surround an outer circumference surface of the bobbin 240. For example, the coil 250 may be wound around a lower portion (or a lower side) of the bobbin 240. The coil 250 may be supplied with a signal (or a current) from an outside source to generate a vibration (or a sound). The coil 250 may be referred to as a voice coil. For example, the bobbin 240 and the coil 250 may be referred to as a voice coil. The coil 250 may be wound around a certain region of the bobbin 240.

According to an aspect of the present disclosure, when the signal is applied to the coil 250, the bobbin 240 may vertically vibrate in a Z direction of the second vibration generating apparatus 200' according to Fleming's left-hand rule based on an application magnetic field generated around the coil 250 and a magnetic field generated around the magnet 220. For example, a magnet flux generated by a magnetic field may flow along a closed loop which is connected with the coil 250, the frame 210, and the magnet 220. Accordingly, the bobbin 240 may vibrate in a vertical direction, and thus, may directly or indirectly vibrate the vibration member 100. For example, the bobbin 240 may vibrate the first vibration generating apparatus 200 or the vibration member 100. The bobbin 240 may be disposed at the rear surface of the first vibration generating apparatus 200, and a vibration of the bobbin 240 may be transferred to the vibration member 100 through the first vibration generating apparatus 200. Alternatively, the bobbin 240 may be disposed at the rear surface of the vibration member 100, and the bobbin 240 may directly vibrate the vibration member 100.

The second vibration generating apparatus 200' according to an aspect of the present disclosure may further include a center pole 230 and a damper 260.

The center pole 230 may be disposed (or provided) on the magnet 220. The center pole 230 may be inserted into the hollow portion of the bobbin 240, or may be surrounded by the bobbin 240. The center pole 230 may be provided in the same shape as that of the magnet 220. The center pole 230 may guide a rectilinear reciprocating motion of the bobbin 240. According to an aspect of the present disclosure, the center pole 230 may be configured to have an appropriate height for guiding the rectilinear reciprocating motion of the bobbin 240. For example, the center pole 230 may be provided as one body with the magnet 220. For example, the center pole 230 may be referred to as pole pieces.

The damper 260 may be configured to guide a vibration of the bobbin 240. The damper 260 may be disposed between the frame 210 and the bobbin 240 and may guide a vibration of the bobbin 240. For example, the damper 260 may be disposed between the bobbin 240 and the first frame 211 and may guide a vibration of the bobbin 240. For example, one end (or one side) of the damper 260 may be connected with the frame 210, and the other end (or the other side) of the damper 260 may be connected with the bobbin 240. The damper 260 may be provided in a structure which is creased between the one end and the other end thereof. Therefore, the damper 260 may be contracted and relaxed based on a vertical vibration (or a rectilinear reciprocating motion) of the bobbin 240 and may adjust and guide a vibration of the bobbin 240. For example, the damper 260 may be connected between the frame 210 and the bobbin 240, and thus, may limit a vibration distance of the bobbin 240 by using a reciprocating force. For example, when the bobbin 240 moves by a certain distance or more or vibrates by a certain distance or less, the bobbin 240 may be restored to an original position with the reciprocating force of the damper 260. For example, the damper 260 may be referred to as other term such as an edge, a spider, or a suspension, but aspects of the present disclosure are not limited thereto.

Referring to FIG. 10, in the second vibration generating apparatus 200' according to an aspect of the present disclosure, the damper 260 may be connected (or coupled) between the frame 210 and the bobbin 240.

The damper 260 may be provided to act as a linear guide. The damper 260 may include a first damper 260-1 which receives a positive (+) (or first-polarity) vibration driving signal (or a voice signal or a sound signal) and a second damper 260-2 which receives a negative (−) (or second-polarity) vibration driving signal (or a voice signal or a sound signal).

The damper 260 may be divided vertically with respect to a first direction X (or a horizontal direction). For example, in the damper 260, with respect to a center line passing through a center portion of the bobbin 240 in the first direction X, the first damper 260-1 may be disposed on the center line, and the second damper 260-2 may be disposed under the center line. For example, the first damper 260-1 may include a first signal terminal T1 for a positive (+) (or first-polarity) vibration driving signal. The second damper 260-2 may include a second signal terminal T2 for a negative (−) (or second-polarity) vibration driving signal. The first signal terminal T1 and the second signal terminal T2 may be referred to as a signal pad, but aspects of the present disclosure are not limited to the terms.

According to an aspect of the present disclosure, each of the first damper 260-1 and the second damper 260-2 may include an inner portion **260*a*, an outer portion 260*b*, and a plurality of damping portions 260*c***.

The inner portion **260*a* may be configured to have a circular shape, an oval shape, or a polygonal (for example, tetragonal) shape. The inner portion 260*a* may be coupled (or connected) to the bobbin 240. For example, a center portion of the inner portion 260*a* may be the same as the center portion of the bobbin 240. The inner portions 260*a* of the first damper 260-1 and the second damper 260-2 may be separated (or isolated) from each other in the center line passing through the center portion of the bobbin 240** in the first direction X (or the horizontal direction), and thus, may be electrically disconnected from each other.

The outer portion **260*b* may be configured to have a circular shape, an oval shape, or a polygonal (for example, tetragonal) shape. The outer portion 260*b* may be provided to surround the inner portion 260*a*. The outer portion 260*b* may be disposed at or coupled to the frame 210. For example, a center portion of the outer portion 260*b* may be the same as the center portion of the bobbin 240. The outer portions 260*b* of the first damper 260-1 and the second damper 260-2 may be separated (or isolated) from each other in the center line passing through the center portion of the bobbin 240** in the first direction X (or the horizontal direction), and thus, may be electrically disconnected from each other.

Each of the plurality of damping portions **260*c* may be connected between the inner portion 260*a* and the outer portion 260*b* to have a certain interval (or an equal interval). For example, each of the plurality of damping portions 260*c* may be configured to have an S-shape or a zigzag shape, but aspects of the present disclosure are not limited thereto. Each of the plurality of damping portions 260*c* may be contracted and relaxed based on a vertical vibration (or a rectilinear reciprocating motion) of the inner portion 260*a* based on a vertical motion of the bobbin 240 and may adjust and guide a vibration of the bobbin 240. For example, each of the plurality of damping portions 260*c* may have a distance which is relatively longer than a shortest distance between the frame 210 and the bobbin 240, and thus, a thickness of the second vibration generating apparatus 200' may decrease and a length of the damper 260 may be configured to be long for enhancing the performance of the magnet 220**.

According to an aspect of the present disclosure, one end of each of the plurality of damping portions **260*c* may be connected with the inner portion 260*a*. In this case, a connection portion between one end of each of the plurality of damping portions 260*c* and the inner portion 260*a* may be rounded in a curved shape, and thus, the tearing of the damping portion 260*c* caused by a vertical motion of a corresponding damping portion 260*c*** may be prevented.

The damper 260 according to an aspect of the present disclosure may be electrically connected with a signal cable (or a signal connection member).

The first signal terminal T1 and the second signal terminal T2 of the damper 260 may be electrically connected with the sound processing circuit through the signal cable (or the signal connection member). According to an aspect of the present disclosure, the first signal terminal T1 and the second signal terminal T2 of the damper 260 may be disposed at an edge portion of the frame 210 to electrically connect with the signal cable. For example, the first signal terminal T1 and the second signal terminal T2 may extend from the damper 260 and may be disposed at the edge portion of the frame 210.

The signal cable (or the signal connection member) may be electrically connected with the damper 260 of the second vibration generating apparatus 200' and may supply the vibration driving signal (or the sound signal or the voice signal), provided from the sound processing circuit, to the second vibration generating apparatus 200'. The signal cable according to an aspect of the present disclosure may include a first terminal electrically connected with the first signal terminal T1 of the damper 260 and a second terminal electrically connected with the second signal terminal T2 of the damper 260. For example, the signal cable may be configured as a flexible printed circuit cable, a flexible flat cable, a single-sided flexible printed circuit, a single-sided flexible PCB, a flexible multi-layer printed circuit, or a flexible multi-layer PCB, but aspects of the present disclosure are not limited thereto.

The signal cable according to an aspect of the present disclosure may be electrically connected with one of the first signal terminal T1 and the second signal terminal T2 of the second vibration generating apparatus 200' and may supply one of the first-polarity vibration driving signal and the second-polarity vibration driving signal supplied from the sound processing circuit. For example, the signal cable may include one of a first terminal for supplying the positive (+) (or first-polarity) vibration driving signal supplied from the sound processing circuit and a second terminal for supplying the negative (−) (or second-polarity) vibration driving signal supplied from the sound processing circuit. For example, the signal cable may include only the first terminal for supplying the positive (+) (or first-polarity) vibration driving signal supplied from the sound processing circuit, or may include only the second terminal for supplying the negative (−) (or second-polarity) vibration driving signal supplied from the sound processing circuit. For example, the first terminal of the signal cable may be electrically connected with the first signal terminal T1 of the second vibration generating apparatus 200' and may supply the second vibration generating apparatus 200' with only the positive (+) (or first-polarity) vibration driving signal supplied from the sound processing circuit. Alternatively, the second terminal of the signal cable may be electrically connected with the second signal terminal T2 of the second vibration generating apparatus 200' and may supply the second vibration generating apparatus 200' with only the negative (−) (or second-polarity) vibration driving signal supplied from the sound processing circuit. According to an aspect of the present disclosure, the signal cable may provide a single signal path and may be configured to include only one of the first terminal and the second terminal.

The sound processing circuit may generate an AC vibration driving signal including a first vibration driving signal and a second vibration driving signal, based on sound data provided from an external sound data generating circuit. The first vibration driving signal may be one of the positive (+) vibration driving signal and the negative (−) vibration driving signal, and the second vibration driving signal may be one of the positive (+) vibration driving signal and the negative (−) vibration driving signal. For example, the first vibration driving signal may be supplied to the coil 250 through the first signal terminal T1 of the second vibration generating apparatus 200' and the first damper 260-1. The second vibration driving signal may be supplied to the coil 250 through the second signal terminal T2 of the second vibration generating apparatus 200' and the second damper 260-2. According to an aspect of the present disclosure, only one of the first vibration driving signal and the second vibration driving signal may be supplied to the second vibration generating apparatus 200'. For example, the second vibration generating apparatus 200' may be electrically connected with the first terminal of the signal cable and the first signal terminal T1 and may only be supplied with the first vibration driving signal, and may not be supplied with the second driving signal. Alternatively, the second vibration generating apparatus 200' may be electrically connected with the second terminal of the signal cable and the second signal terminal T2 and may be supplied with the second vibration driving signal, and may not be supplied with the first driving signal.

The second vibration generating apparatus 200' according to an aspect of the present disclosure may further include a bobbin ring 245.

The bobbin ring 245 may be configured to protect the bobbin 240 from an impact or prevent a deformation of the bobbin 240 caused by an impact. The bobbin ring 245 may be configured to protect the bobbin 240 or transfer a vibration of the bobbin 240 to the first vibration generating apparatus 200 or the vibration member 100. The bobbin ring 245 may vibrate along with the bobbin 240.

The bobbin ring 245 may be disposed between the first vibration generating apparatus 200 or the vibration member 100. For example, the bobbin ring 245 may be configured to increase a coupling force between the rear surface of the first vibration generating apparatus 200 and the bobbin 240. Alternatively, the bobbin ring 245 may be configured to increase a coupling force between the rear surface of the vibration member 100 and the bobbin 240. For example, the bobbin ring 245 may be configured to prevent the bobbin 240 from being dropped or stripped from the rear surface of the vibration member 100 or the first vibration generating apparatus 200.

The bobbin ring 245 may be configured to be connected (or coupled) with the bobbin 240. The bobbin ring 245 may be configured to be connected (or coupled) with an upper end portion of the bobbin 240. A rear surface of the bobbin ring 245 may be connected (or coupled) with the bobbin 240. A front surface of the bobbin ring 245 may be connected (or coupled) with the rear surface of the first vibration generating apparatus 200 or the rear surface of the vibration member 100. According to an aspect of the present disclosure, the bobbin ring 245 may be adhered (or connected) to the bobbin 240 by using an adhesive member and may be adhered (or connected) to the rear surface of the first vibration generating apparatus 200 by using a coupling member, or may be adhered (or connected) to the rear surface of the vibration member 100.

The bobbin ring 245 may have the same shape as that of the bobbin 240. The bobbin ring 245 may have the same shape as that of the bobbin 240 and may have a width which is greater than that of the bobbin 240. For example, the bobbin ring 245 may include an injection material.

The bobbin ring 245 may be provided to encapsulate an upper end portion of the bobbin 240. For example, the upper end portion of the bobbin 240 may include an uppermost surface (or an end surface) of the bobbin 240 and an upper outer perimeter surface adjacent thereto. For example, the upper end portion of the bobbin 240 may include an end portion or an end edge portion of the bobbin 240. For example, the bobbin ring 245 may be configured to include a groove (or an inserting groove or a bobbin inserting groove) which accommodates the upper end portion of the bobbin 240. The groove may be configured to overlap the bobbin 240 or to be concave from a lower surface of the bobbin ring 245. Accordingly, the bobbin ring 245 may include a cross-sectional surface having a recessed groove that the bobbin 240 fits into, and includes a pair of sidewalls parallel to each other with the groove.

The upper end portion of the bobbin 240 may be inserted into the groove of the bobbin ring 245. The bobbin ring 245 may be connected (or coupled) to the upper end portion of the bobbin 240 by using an adhesive member. For example, the adhesive member may be disposed or interposed between the upper end portion of the bobbin 240 and an inner surface of the groove of the bobbin ring 245. Accordingly, a coupling force between the bobbin 240 and the bobbin ring 245 may be complemented.

The bobbin ring 245 may include fiber reinforced plastics, composite resin including fiber reinforced plastics, or metal, and thus, may perform a heat dissipation function of dissipating heat which occurs when the second vibration generating device 200' is driven. For example, the fiber reinforced plastics may be one of carbon fiber reinforced plastics (CFRP), glass fiber reinforced plastics (GFRP), or a combination thereof, but aspects of the present disclosure are not limited thereto. Carbon fiber may be good in stability because of a thermal expansion coefficient and may have good electrical conductivity, corrosion resistance, vibration attenuation, and X-ray permeability properties. Also, a glass fiber may be light and good in durability, impact resistance, and abrasion resistance, may not be rusted, may be low in thermal conductivity, and may be easy to process. For example, the metal may be aluminum, but aspects of the present disclosure are not limited thereto.

The adhesive member between the bobbin 240 and the bobbin ring 245 may be adhesive resin. For example, the adhesive resin may be epoxy resin or acryl resin, but aspects of the present disclosure are not limited thereto.

In the apparatus according to an aspect of the present disclosure, the first vibration generating apparatus 200 may be disposed or interposed between the vibration member 100 and the second vibration generating apparatus 200'.

The first vibration generating apparatus 200 may prevent or minimize the transfer of heat that is generated due to a vibration of the second vibration generating apparatus 200', to the vibration member 100. The first vibration generating apparatus 200 may be configured to have a size greater than that of the second vibration generating apparatus 200'\, or cover the second vibration generating apparatus 200'. For example, the first vibration generating apparatus 200 may contact the bobbin 240 of the second vibration generating apparatus 200'. The first vibration generating apparatus 200 may contact the bobbin ring 245 of the second vibration generating apparatus 200'. The first vibration generating apparatus 200 may have a size which is greater than that of the bobbin ring 245 or the bobbin 240 of the second vibration generating apparatus 200' contacting the first vibration generating apparatus 200. Accordingly, in the apparatus according to an aspect of the present disclosure, the first vibration generating apparatus 200 may prevent or minimize the transfer of heat due to a vibration of the second vibration generating apparatus 200' to the vibration member 100, and thus, may decrease an adverse effect of heat on the display panel or the vibration member 100 or the image quality of the display panel. For example, the second vibration generating apparatus 200' may be attached on the first vibration generating apparatus 200 by an adhesive member. The adhesive member may be a double-sided tape, single-sided tape, or a bond, but aspects of the present disclosure are not limited thereto. For example, the adhesive member may be disposed between the first vibration generating apparatus 200 and the bobbin 240 or the bobbin ring 245.

A gap space GS may be provided between the vibration member 100 and the supporting member 300. A partition member, which provides or limits the gap space GS, may be further disposed between the vibration member 100 and the supporting member 300. For example, the partition member may provide or define the gap space GS where a sound is generated when the vibration member 100 is vibrated by the vibration apparatuses 200 and 200'. The partition member may separate a sound generated by the vibration member 100 or may separate a channel and may prevent or reduce interference of a sound. The partition member may be referred to as an enclosure or a baffle, but aspects of the present disclosure are not limited to the terms.

Figure 11:
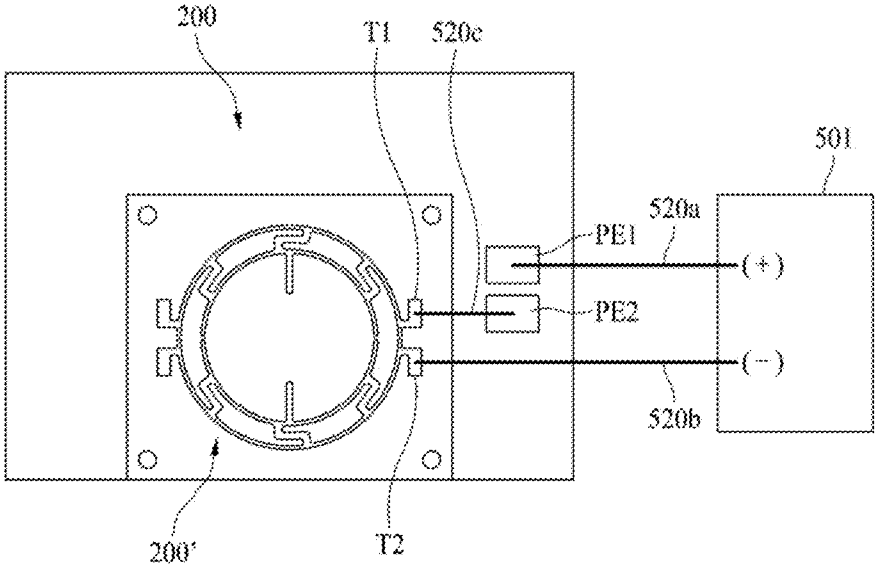
FIG. 11 illustrates a signal connection structure of a vibration apparatus according to an aspect of the present disclosure.

FIG. 11 illustrates a signal connection structure of a vibration apparatus according to an aspect of the present disclosure.

Referring to FIG. 11, an apparatus according to an aspect of the present disclosure may include vibration apparatuses 200 and 200' and a control board 501 which controls the vibration apparatuses 200 and 200'.

The vibration apparatuses 200 and 200' according to an aspect of the present disclosure may include a first vibration generating apparatus 200 and a second vibration generating apparatus 200'. The first vibration generating apparatus 200 and the second vibration generating apparatus 200' may be serially connected with each other. At least a portion of the first vibration generating apparatus 200 may overlap the second vibration generating apparatus 200'. For example, the first vibration generating apparatus 200 may be disposed or interposed between a vibration member 100 and the second vibration generating apparatus 200'. The second vibration generating apparatus 200' may be adjacent to or contact a rear surface of the first vibration generating apparatus 200. For example, the second vibration generating apparatus 200' may be connected or coupled to the rear surface of the first vibration generating apparatus 200.

The control board 501 may include a sound processing circuit which generates a vibration driving signal (or a vibration signal or a sound signal or a voice signal) for controlling vibration driving or driving of the first vibration generating apparatus 200 and the second vibration generating apparatus 200'. For example, the sound processing circuit may generate an AC vibration driving signal including a first vibration driving signal and a second vibration driving signal, based on sound data provided from an external sound data generating circuit unit. For example, the sound processing circuit may be referred to as an audio circuit, an audio amplifier circuit, an audio amplifier, or an audio amplifier unit, but aspects of the present disclosure are not limited thereto.

The control board 501 may be implemented as a PCB with the sound processing circuit mounted thereon. The control board 501 may be disposed at the rear surface of the supporting member 300. For example, the control board 501 may be attached on the rear surface of the supporting member 300.

The control board 501 according to an aspect of the present disclosure may be connected with the first vibration generating apparatus 200 and the second vibration generating apparatus 200' through the same signal path. The control board 501 may be connected with the first vibration generating apparatus 200 and the second vibration generating apparatus 200' through a single signal path. The first vibration generating apparatus 200 and the second vibration generating apparatus 200' connected with the control board 501 may be serially connected with each other. For example, the control board 501 may be connected with the first vibration generating apparatus 200 and the second vibration generating apparatus 200' through a single signal path of a closed loop type. For example, the single signal path may be connected with the first vibration generating apparatus 200 and the second vibration generating apparatus 200' in a closed loop type with the control board 501 therebetween. The control board 501 may apply the same vibration driving signal through a single signal path connected with the first vibration generating apparatus 200 and the second vibration generating apparatus 200' in common, and thus, may drive or vibrate the first vibration generating apparatus 200 and the second vibration generating apparatus 200' simultaneously.

The control board 501 may output a positive (+) (or first-polarity) vibration driving signal and a negative (−) (or second-polarity) vibration driving signal generated by the sound processing circuit. For example, the control board 501 may include a first signal output terminal (+) for outputting the positive (+) (or first-polarity) vibration driving signal and a second signal output terminal (−) for outputting the negative (−) (or second-polarity) vibration driving signal. The first signal output terminal (+) and the second signal output terminal (−) of the control board 501 may be electrically connected with the first vibration generating apparatus 200 and the second vibration generating apparatus 200' through a signal cable (or a signal connection member). For example, the signal cable (or the signal connection member) may include a first signal cable (or the first signal connection member) 520*a*, a second signal cable (or the second signal connection member) 520*b*, and a third signal cable (or the third signal connection member) 520*c*.

The control board 501 may be connected with the first vibration generating apparatus 200 through a positive (+) (or first-polarity) signal connection path and may be connected with the second vibration generating apparatus 200' through a negative (−) (or second-polarity) signal connection path. For example, the first signal output terminal (+) of the control board 501 may be electrically connected with a first pad electrode PE1 of the first vibration generating apparatus 200 through the first signal cable 520*a*. Also, the second signal output terminal (−) of the control board 501 may be electrically connected with a second signal terminal T2 of the second vibration generating apparatus 200' through the second signal cable 520*b*. Also, a second pad electrode PE2 of the first vibration generating apparatus 200 and a first signal terminal T1 of the second vibration generating apparatus 200' may be electrically connected with each other through the third signal cable 520*c*.

The control board 501, the first vibration generating apparatus 200, and the second vibration generating apparatus 200' may be serially connected with one another through the first signal cable 520*a*, the second signal cable 520*b*, and the third signal cable 520*c* in a closed loop type. For example, the positive (+) (or first-polarity) vibration driving signal output from the first signal output terminal (+) of the control board 501 may be supplied to the second vibration generating apparatus 200' via the first vibration generating apparatus 200. Also, the negative (−) (or second-polarity) vibration driving signal output from the second signal output terminal (−) of the control board 501 may be supplied to the first vibration generating apparatus 200 via the second vibration generating apparatus 200'.

According to another aspect of the present disclosure, the control board 501 may be connected with the second vibration generating apparatus 200' through the positive (+) (or first-polarity) signal connection path and may be connected with the first vibration generating apparatus 200 through the negative (−) (or second-polarity) signal connection path. For example, the first signal output terminal (+) of the control board 501 may be electrically connected with the first signal terminal T1 of the second vibration generating apparatus 200' through the first signal cable 520*a*. Also, the second signal output terminal (−) of the control board 501 may be electrically connected with the second pad electrode PE2 of the first vibration generating apparatus 200 through the second signal cable 520*b*. Also, the first pad electrode PE1 of the first vibration generating apparatus 200 and the second signal terminal T2 of the second vibration generating apparatus 200' may be electrically connected with each other through the third signal cable 520*c*.

The control board 501, the first vibration generating apparatus 200, and the second vibration generating apparatus 200' may be serially connected with one another through the first signal cable 520*a*, the second signal cable 520*b*, and the third signal cable 520*c* in a closed loop type. For example, the positive (+) (or first-polarity) vibration driving signal output from the first signal output terminal (+) of the control board 501 may be supplied to the second vibration generating apparatus 200' via the first vibration generating apparatus 200. Also, the negative (−) (or second-polarity) vibration driving signal output from the second signal output terminal (−) of the control board 501 may be supplied to the second vibration generating apparatus 200' via the first vibration generating apparatus 200.

In the apparatus according to an aspect of the present disclosure, the first vibration generating apparatus 200 and the second vibration generating apparatus 200' may be serially connected with each other, and the first-polarity or second-polarity vibration driving signal output from the control board 501 may be supplied to one of the first vibration generating apparatus 200 and the second vibration generating apparatus 200' via the other of the first vibration generating apparatus 200 and the second vibration generating apparatus 200', and thus, electrical characteristics of the first vibration generating apparatus 200 and the second vibration generating apparatus 200' may be complementary. Accordingly, a load of the control board 501 may decrease, and thus, separate sound signal processing or a cement resistor for reducing the load of the control board 501 may not be required, thereby simplifying a configuration of the control board 501. The first vibration generating apparatus 200 and the second vibration generating apparatus 200' may mutually complement and output a sound of a middle-high-frequency band and a sound of a middle-low-frequency band, and thus, a sound characteristic and a sound pressure level characteristic may be enhanced. The first vibration generating apparatus 200 and the second vibration generating apparatus 200' may be configured in a stacked configuration which overlaps each other, and thus, an interval of a gap space GS between the vibration member 100 and a supporting member 300 may be reduced, thereby enhancing a sound characteristic and a sound pressure level characteristic.

Figure 12:
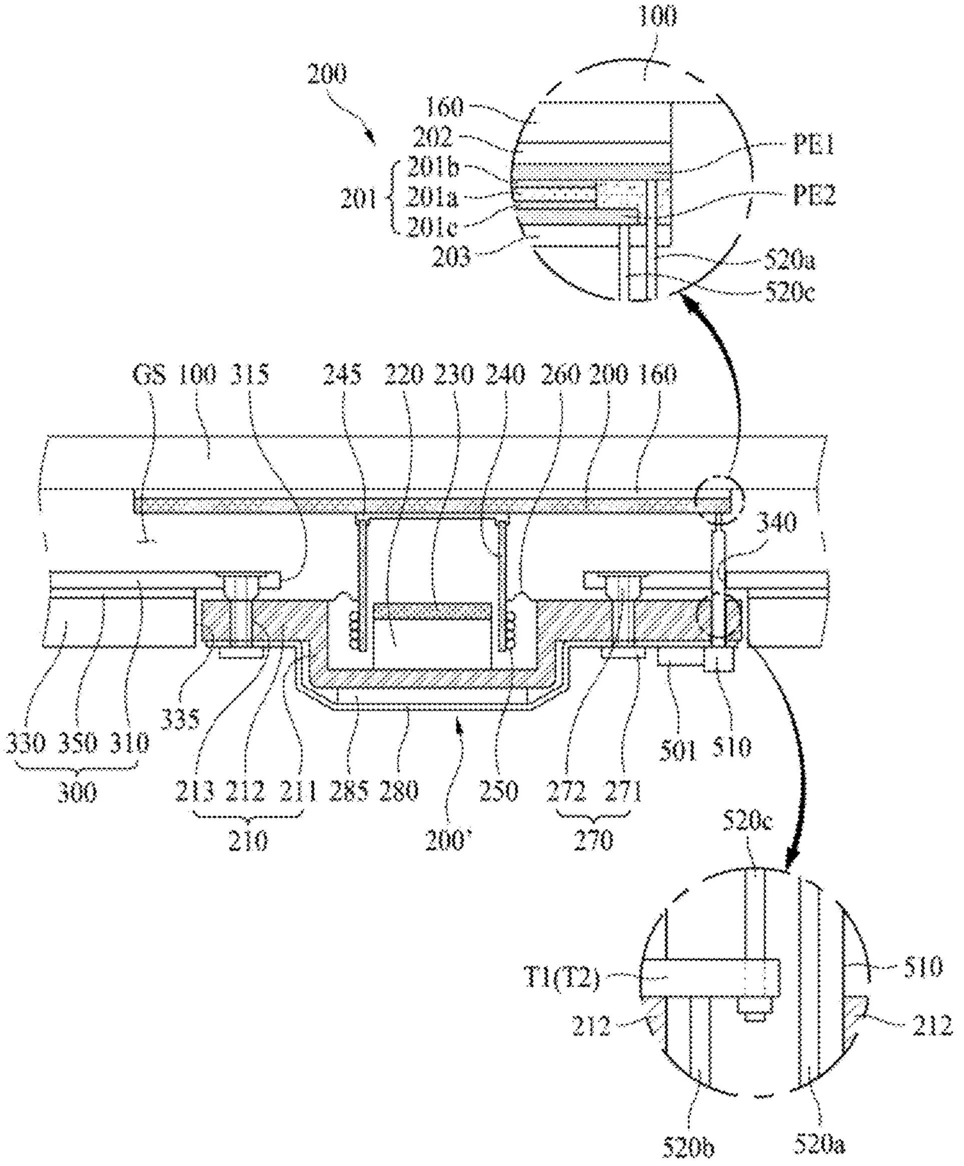
FIG. 12 illustrates a vibration apparatus according to an aspect of the present disclosure.

FIG. 12 illustrates a vibration apparatus according to an aspect of the present disclosure. FIG. 12 illustrates an aspect where configurations of a control board and a signal connection member are added to the vibration apparatus described above with reference to FIGS. 1 to 11. In the following description, therefore, the other elements except a control board, a signal connection member, and relevant elements are referred to by like reference numerals, and repeated descriptions thereof are omitted or will be briefly given.

Referring to FIG. 12, in an apparatus or vibration apparatuses 200 and 200' according to an aspect of the present disclosure, a control board 501 controlling a first vibration generating apparatus 200 and a second vibration generating apparatus 200' may be disposed at a rear surface of the second vibration generating apparatus 200'. Also, the control board 501 may further include a signal connector 510 (or a signal connection member).

The control board 501 may be implemented as a PCB with a sound processing circuit mounted thereon. The control board 501 may be disposed at the rear surface of the second vibration generating apparatus 200'. For example, the control board 501 may be disposed at or connected with the rear surface of the second vibration generating apparatus 200'. The control board 501 may be disposed at or connected with a rear surface of a frame 210 of the second vibration generating apparatus 200'.

The control board 501 according to an aspect of the present disclosure may be connected with the first vibration generating apparatus 200 and the second vibration generating apparatus 200' through the same signal path. The control board 501 may be connected with the first vibration generating apparatus 200 and the second vibration generating apparatus 200' through a single signal path. The first vibration generating apparatus 200 and the second vibration generating apparatus 200' connected with the control board 501 may be serially connected with each other. For example, the control board 501 may be connected with the first vibration generating apparatus 200 and the second vibration generating apparatus 200' through a single signal path of a closed loop type, and the first vibration generating apparatus 200 and the second vibration generating apparatus 200' may be simultaneously driven or vibration-driven based on the same vibration driving signal. For example, when a desired sound has a first frequency band (or a high-frequency band or a middle-high-frequency band), the control board 501 may generate a vibration driving signal suitable or optimized for driving or vibration-driving of the first vibration generating apparatus 200 and may apply the vibration driving signal to the first vibration generating apparatus 200 and the second vibration generating apparatus 200'. Alternatively, when a desired sound has a second frequency band (or a low-frequency band or a middle-high-frequency band), the control board 501 may generate a vibration driving signal suitable or optimized for driving the second vibration generating apparatus 200' and may apply the vibration driving signal to the first vibration generating apparatus 200 and the second vibration generating apparatus 200'.

The control board 501 may include a signal connector 510 (or a signal connection member) which applies the vibration driving signal to the first vibration generating apparatus 200 and the second vibration generating apparatus 200'. The signal connector 510 may be commonly connected with the first vibration generating apparatus 200 and the second vibration generating apparatus 200'.

The control board 501 may be electrically connected with the first vibration generating apparatus 200 and the second vibration generating apparatus 200' through the signal connector 510. For example, the signal connector 510 may be disposed at or connected with a rear surface of the second vibration generating apparatus 200'. The signal connector 510 may be disposed at or connected with the rear surface of the frame 210 of the second vibration generating apparatus 200'. The control board 501 may be disposed at or connected with the rear surface of the second frame 212 of the frame 210.

A supporting member 300 may include a contact hole 340 which overlaps the signal connector 510. For example, the contact hole 340 may be configured so that the signal connector 510 passes through a region between an outer portion and an inner portion of the supporting member 300. The contact hole 340 may be punched in a partial region of the supporting member 300 in a thickness direction (e.g., the Z direction) of the supporting member 300. For example, the contact hole 340 may be provided in a first supporting member 310 of the supporting member 300. The contact hole 340 may be provided in the first supporting member 310 exposed through a second through hole 335 of a second supporting member 330 of the supporting member 300.

The signal connector 510 may include a first signal connection member 520*a*, a second signal connection member 520*b*, and a third signal connection member 520*c*.

The control board 501 may be connected with the first vibration generating apparatus 200 through the first signal connection member 520*a*. For example, the first signal connection member 520*a* of the signal connector 510 may be connected with the first vibration generating apparatus 200 through the contact hole 340 of the supporting member 300. The control board 501 may be connected with a first pad electrode PE1 of the first vibration generating apparatus 200 through the first signal connection member 520*a* of the signal connector 510. The control board 501 may supply a positive (+) vibration driving signal to the first pad electrode PE1 of the first vibration generating apparatus 200 through the first signal connection member 520*a* of the signal connector 510. For example, the positive (+) vibration driving signal output from the control board 501 may be supplied to a first electrode layer 201*b* through the first signal connection member 520*a* of the signal connector 510, the first pad electrode PE1 of the first vibration generating apparatus 200, and a first power supply line PL1.

The control board 501 may be connected with the second vibration generating apparatus 200' through the second signal connection member 520*b* of the signal connector 510. For example, the second signal connection member 520*b* of the signal connector 510 may be connected with a second signal terminal T2 provided in the second vibration generating apparatus 200'. The control board 501 may be connected with the second signal terminal T2 of the second vibration generating apparatus 200' though the second signal connection member 520*b* of the signal connector 510. The control board 501 may supply a negative (−) vibration driving signal to the second signal terminal T2 of the second vibration generating apparatus 200' through the second signal connection member 520*b* of the signal connector 510. For example, the negative (−) vibration driving signal output from the control board 501 may be supplied to a coil 250 through the second signal connection member 520*b* of the signal connector 510, the second signal terminal T2 of the second vibration generating apparatus 200', and a second damper 260-2.

The first vibration generating apparatus 200 and the second vibration generating apparatus 200' may be connected with each other through the third signal connection member 520*c* of the signal connector 510. The first vibration generating apparatus 200 and the second vibration generating apparatus 200' may be serially connected with each other through the third signal connection member 520*c* of the signal connector 510. For example, the third signal connection member 520*c* of the signal connector 510 may be connected with the second vibration generating apparatus 200' at one end (or one side) thereof, and the other end (or the other side) thereof may be connected with the first vibration generating apparatus 200 through the contact hole 340 of the supporting member 300. The one end of the third signal connection member 520*c* may be connected with the first signal terminal T1 of the second vibration generating apparatus 200', and the other end thereof may be connected with the second pad electrode PE2 of the first vibration generating apparatus 200. The third signal connection member 520*c* may connect the first signal terminal T1 of the second vibration generating apparatus 200' with the second pad electrode PE2 of the first vibration generating apparatus 200 and may not be connected with the control board 501. For example, the third signal connection member 520*c* may be in an electrical floating state when the vibration driving signal is not applied from the control board 501.

According to another aspect of the present disclosure, the control board 501 may be connected with the second vibration generating apparatus 200' through the first signal connection member 520*a* of the signal connector 510. For example, the first signal connection member 520*a* of the signal connector 510 may be connected with the first signal terminal T1 provided in the second vibration generating apparatus 200'. The control board 501 may supply a positive (+) vibration driving signal to the first signal terminal T1 of the second vibration generating apparatus 200' through the first signal connection member 520*a* of the signal connector 510. For example, the positive (+) vibration driving signal output from the control board 501 may be supplied to the coil 250 through the first signal connection member 520*a* of the signal connector 510, the first pad electrode PE1 of the second vibration generating apparatus 200', and a first damper 260-1.

The control board 501 may be connected with the first vibration generating apparatus 200 through the second signal connection member 520*b* of the signal connector 510. For example, the second signal connection member 520*b* of the signal connector 510 may be connected with the first vibration generating apparatus 200 through the contact hole 340 of the supporting member 300. The control board 501 may be connected with a second pad electrode PE2 of the first vibration generating apparatus 200 through the second signal connection member 520*b* of the signal connector 510. The control board 501 may supply the negative (−) vibration driving signal to the second pad electrode PE2 of the first vibration generating apparatus 200 through the second signal connection member 520*b* of the signal connector 510. For example, the negative (−) vibration driving signal output from the control board 501 may be supplied to a second electrode layer 201*c* through the second signal connection member 520*b* of the signal connector 510, the second pad electrode PE2 of the first vibration generating apparatus 200, and a second power supply line PL2.

The first vibration generating apparatus 200 and the second vibration generating apparatus 200' may be connected with each other through the third signal connection member 520*c* of the signal connector 510. The first vibration generating apparatus 200 and the second vibration generating apparatus 200' may be serially connected with each other through the third signal connection member 520*c* of the signal connector 510. For example, the third signal connection member 520*c* of the signal connector 510 may be connected with the second vibration generating apparatus 200' at one end (or one side) thereof, and the other end (or the other side) thereof may be connected with the first vibration generating apparatus 200 through the contact hole 340 of the supporting member 300. The one end of the third signal connection member 520*c* may be connected with the second signal terminal T2 of the second vibration generating apparatus 200', and the other end thereof may be connected with the first pad electrode PE1 of the first vibration generating apparatus 200. The third signal connection member 520*c* may connect the second signal terminal T2 of the second vibration generating apparatus 200' with the first pad electrode PE1 of the first vibration generating apparatus 200 and may not be connected with the control board 501. For example, the third signal connection member 520*c* may be in an electrical floating state when the vibration driving signal is not applied from the control board 501.

Figure 13:
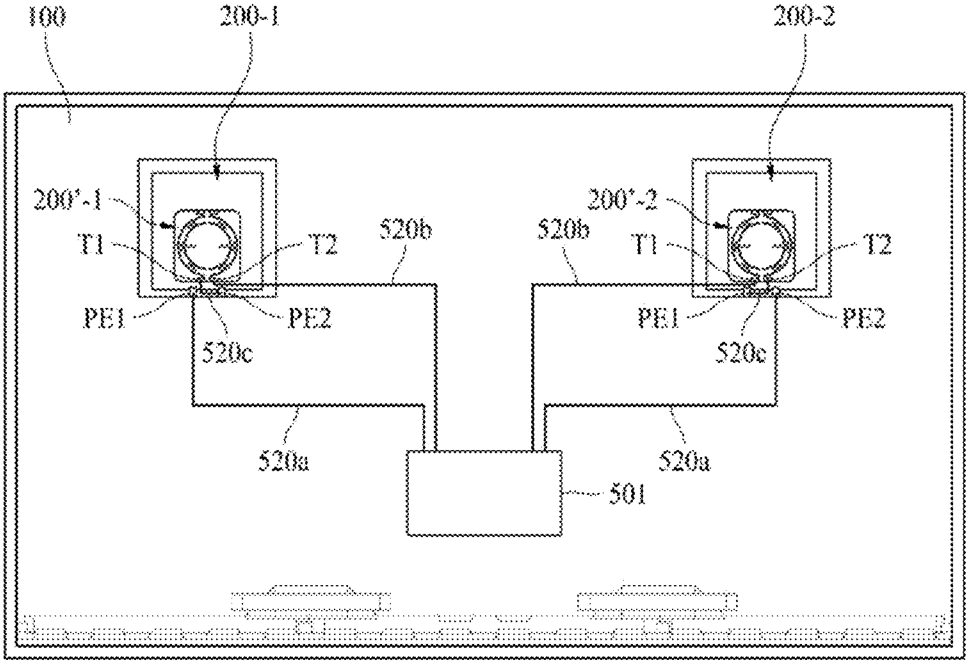
FIG. 13 illustrates an apparatus according to another aspect of the present disclosure.

FIG. 13 illustrates an apparatus according to another aspect of the present disclosure. FIG. 13 illustrates an aspect implemented by modifying the arrangement of the vibration apparatus described above with reference to FIGS. 1 to 12. In the following description, therefore, the other elements except the arrangement of a vibration apparatus and relevant elements are referred to by like reference numerals, and repeated descriptions thereof are omitted or will be briefly given.

Referring to FIG. 13, in an apparatus according to another aspect of the present disclosure, a rear surface (or a backside surface) of a vibration member 100 may be divided into a plurality of regions, and the apparatus may include a first vibration generating apparatuses 200-1 and 200'-1 and a second vibration generating apparatuses 200-2 and 200'-2 disposed in the plurality of regions. The apparatus according to another aspect of the present disclosure may include a control board 501 which controls the first vibration generating apparatuses 200-1 and 200'-1 and the second vibration generating apparatuses 200-2 and 200'-2, at the rear surface of the vibration member 100. For example, the vibration member 100 may be divided into a left region (or a first region) and a right region (or a second region) with respect to a first direction X (or a horizontal direction) of the vibration member 100, but aspects of the present disclosure are not limited thereto. The first vibration generating apparatuses 200-1 and 200'-1 may be disposed in the left region, and the second vibration generating apparatuses 200-2 and 200'-2 may be disposed in the right region.

The first vibration generating apparatuses 200-1 and 200'-1 may be disposed in a left region of the vibration member 100. The first vibration generating apparatus 200-1 and the second vibration generating apparatus 200'-1 may at least partially overlap each other. For example, at least a portion of the first vibration generating apparatus 200-1 may overlap the first vibration generating apparatus 200'-1.

The second vibration generating apparatuses 200-2 and 200'-2 may be disposed in a right region of the vibration member 100. The second vibration generating apparatus 200-2 may at least partially overlap each the second vibration generating apparatus 200'-2. For example, at least a portion of the second vibration generating apparatus 200-2 may overlap the second vibration generating apparatus 200'-2.

The control board 501 may be connected with each of the first vibration generating apparatuses 200-1 and 200'-1 and the second vibration generating apparatuses 200-2 and 200'-2 through the same signal path. The control board 501 may be connected with each of the first vibration generating apparatuses 200-1 and 200'-1 and the second vibration generating apparatuses 200-2 and 200'-2 through a single signal path.

The first vibration generating apparatuses 200-1 and 200'-1 connected with the control board 501 may be serially connected with each other. Also, the second vibration generating apparatuses 200-2 and 200'-2 connected with the control board 501 may be serially connected with each other. For example, the control board 501 may be connected with the first vibration generating apparatuses 200-1 and 200'-1 through a single signal path of a closed loop type. Also, the control board 501 may be connected with the second vibration generating apparatuses 200-2 and 200'-2 through a single signal path of a closed loop type. For example, the single signal path may be connected with the first vibration generating apparatuses 200-1 and 200'-1 in a closed loop type with the control board 501 therebetween and may be connected with the second vibration generating apparatuses 200-2 and 200'-2 in a closed loop type.

The control board 501 may apply the same vibration driving signal through a single signal path connected with each of the first vibration generating apparatuses 200-1 and 200'-1 and the second vibration generating apparatuses 200-2 and 200'-2, and thus, may drive or vibrate the first vibration generating apparatuses 200-1 and 200'-1 simultaneously and may drive or vibrate the second vibration generating apparatuses 200-2 and 200'-2 simultaneously.

The control board 501 may be connected with the first vibration generating apparatuses 200-1 and 200'-1 through a positive (+) (or first-polarity) first signal connection member 520*a* and may be connected with the first vibration generating apparatuses 200-1 and 200'-1 through a negative (−) (or second-polarity) second signal connection member 520*b*. For example, the control board 501 may be electrically connected with a first pad electrode PE1 of the first vibration generating apparatus 200-1 through the first signal connection member 520*a*. Also, the control board 501 may be electrically connected with a second signal terminal T2 of the first vibration generating apparatus 200'-1 through the second signal connection member 520*b*. Also, a second pad electrode PE2 of the first vibration generating apparatus 200-1 and a first signal terminal T1 of the second vibration generating apparatus 200'-1 may be electrically connected with each other through a third signal connection member 520*c*. According to another aspect of the present disclosure, the first signal connection member 520*a* may transfer a negative (−) (or second-polarity) vibration driving signal, and the second signal connection member 520*b* may transfer a positive (+) (or first-polarity) vibration driving signal.

The control board 501 may be connected with the second vibration generating apparatuses 200-2 and 200'-2 through a positive (+) (or first-polarity) second signal connection member 520*b* and may be connected with the second vibration generating apparatuses 200-2 and 200'-2 through a negative (−) (or second-polarity) first signal connection member 520*a*. For example, the control board 501 may be electrically connected with a first signal terminal T1 of the second vibration generating apparatus 200'-2 through the second signal connection member 520*b*. Also, the control board 501 may be electrically connected with a second pad electrode PE2 of the second vibration generating apparatus 200-2 through the first signal connection member 520*a*. Also, a first pad electrode PE1 of the second vibration generating apparatus 200-2 and a second signal terminal T2 of the second vibration generating apparatus 200'-2 may be electrically connected with each other through the third signal connection member 520*c*.

Figure 14:
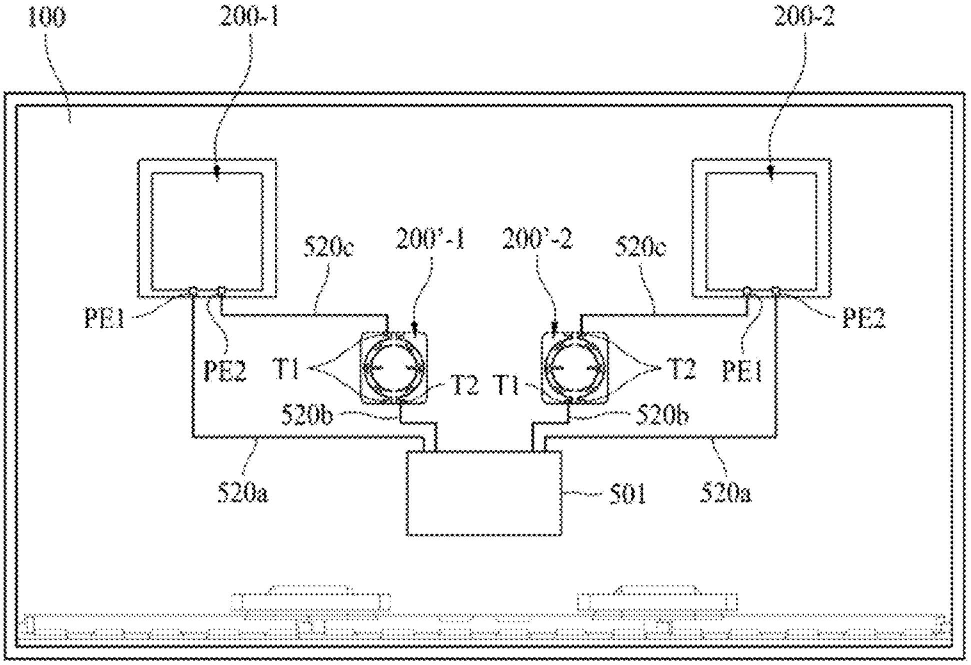
FIG. 14 illustrates an apparatus according to another aspect of the present disclosure.

FIG. 14 illustrates an apparatus according to another aspect of the present disclosure. FIG. 14 illustrates an aspect implemented by modifying the arrangement of the vibration apparatus described above with reference to FIGS. 1 to 12. In the following description, therefore, the other elements except the arrangement of a vibration apparatus and relevant elements are referred to by like reference numerals, and repeated descriptions thereof are omitted or will be briefly given.

Referring to FIG. 14, in an apparatus according to another aspect of the present disclosure, a rear surface (or a backside surface) of a vibration member 100 may be divided into a plurality of regions, and the apparatus may include a first vibration generating apparatuses 200-1 and 200'-1 and a second vibration generating apparatuses 200-2 and 200'-2 disposed in the plurality of regions. The apparatus according to another aspect of the present disclosure may include a control board 501 which controls the first vibration generating apparatuses 200-1 and 200'-1 and the second vibration generating apparatuses 200-2 and 200'-2, at the rear surface of the vibration member 100. For example, the vibration member 100 may be divided into a left region (or a first region) and a right region (or a second region) with respect to a first direction X (or a horizontal direction) of the vibration member 100, but aspects of the present disclosure are not limited thereto. The first vibration generating apparatuses 200-1 and 200'-1 may be disposed in the left region, and the second vibration generating apparatuses 200-2 and 200'-2 may be disposed in the right region.

The first vibration generating apparatuses 200-1 and 200'-1 may be disposed in a left region of the vibration member 100. The first vibration generating apparatuses 200-1 and 200'-1 may not overlap each other. For example, the first vibration generating apparatus 200-1 may be disposed at an upper end of the left region, and the first vibration generating apparatus 200'-1 may be disposed at a center of the left region.

The second vibration generating apparatus 200-2 and 200'-2 may be disposed in a right region of the vibration member 100. The second vibration generating apparatus 200-2 and 200'-2 may include a second vibration generating apparatus 200-2 and a second vibration generating apparatus 200'-2. The second vibration generating apparatus 200-2 and the second vibration generating apparatus 200'-2 may not overlap each other. For example, the second vibration generating apparatus 200-2 may be disposed at an upper end of the right region, and the second vibration generating apparatus 200'-2 may be disposed at a center of the right region.

The control board 501 may be connected with each of the first vibration generating apparatus 200-1 and 200'-1 and the second vibration generating apparatus 200-2 and 200'-2 through the same signal path. The control board 501 may be connected with each of the first vibration generating apparatus 200-1 and 200'-1 and the second vibration generating apparatus 200-2 and 200'-2 through a single signal path.

The first vibration generating apparatus 200-1 and the first vibration generating apparatus 200'-1 of the first vibration generating apparatus 200-1 and 200'-1 connected with the control board 501 may be serially connected with each other. Also, the second vibration generating apparatus 200-2 and the second vibration generating apparatus 200'-2 of the second vibration generating apparatus 200-2 and 200'-2 connected with the control board 501 may be serially connected with each other. For example, the control board 501 may be connected with the first vibration generating apparatus 200-1 and the first vibration generating apparatus 200'-1 of the first vibration generating apparatus 200-1 and 200'-1 through a single signal path of a closed loop type. Also, the control board 501 may be connected with the second vibration generating apparatus 200-2 and the second vibration generating apparatus 200'-2 of the second vibration generating apparatus 200-2 and 200'-2 through a single signal path of a closed loop type. For example, the single signal path may be connected with the first vibration generating apparatus 200-1 and the first vibration generating apparatus 200'-1 in a closed loop type with the control board 501 therebetween and may be connected with the second vibration generating apparatus 200-2 and the second vibration generating apparatus 200'-2 in a closed loop type.

The control board 501 may apply the same vibration driving signal through a single signal path connected with each of the first vibration generating apparatus 200-1 and 200'-1 and the second vibration generating apparatus 200-2 and 200'-2 in common, and thus, may drive or vibrate the first vibration generating apparatus 200-1 and the first vibration generating apparatus 200'-1 of the first vibration generating apparatus 200-1 and 200'-1 simultaneously (or in common) and may drive or vibrate the second vibration generating apparatus 200-2 and the second vibration generating apparatus 200'-2 of the second vibration generating apparatus 200-2 and 200'-2 simultaneously (or in common).

The control board 501 may be connected with the first vibration generating apparatus 200-1 of the first vibration generating apparatus 200-1 and 200'-1 through a positive (+) (or first-polarity) first signal connection member **520*a* and may be connected with the first vibration generating apparatus 200'-1 of the first vibration generating apparatus 200-1 and 200'-1 through a negative (−) (or second-polarity) second signal connection member 520*b*. For example, the control board 501 may be electrically connected with a first pad electrode PE1 of the first vibration generating apparatus 200-1 through the first signal connection member 520*a*. Also, the control board 501 may be electrically connected with a second signal terminal T2 of the first vibration generating apparatus 200'-1 through the second signal connection member 520*b*. Also, a second pad electrode PE2 of the first vibration generating apparatus 200-1 and a first signal terminal T1 of the 1-2$^{nd}$ vibration generating apparatus 200'-1 may be electrically connected with each other through a third signal connection member 520*c*. According to another aspect of the present disclosure, the first signal connection member 520*a* may transfer a negative (−) (or second-polarity) vibration driving signal, and the second signal connection member 520*b*** may transfer a positive (+) (or first-polarity) vibration driving signal.

The control board 501 may be connected with the second vibration generating apparatus 200'-2 of the second vibration generating apparatus 200-2 and 200'-2 through a positive (+) (or first-polarity) second signal connection member **520*b* and may be connected with the second vibration generating apparatus 200'-2 of the second vibration generating apparatus 200-2 and 200'-2 through a negative (−) (or second-polarity) first signal connection member 520*a*. For example, the control board 501 may be electrically connected with a first signal terminal T1 of the second vibration generating apparatus 200'-2 through the second signal connection member 520*b*. Also, the control board 501 may be electrically connected with a second pad electrode PE2 of the second vibration generating apparatus 200-2 through the first signal connection member 520*a*. Also, a first pad electrode PE1 of the second vibration generating apparatus 200-2 and a second signal terminal T2 of the second vibration generating apparatus 200'-2 may be electrically connected with each other through the third signal connection member 520*c***.

The apparatus according to an aspect of the present disclosure may be applied to mobile devices, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, e-books, portable multimedia players (PMPs), personal digital assistants (PDAs), MP3 players, mobile medical apparatuses, desktop personal computers (PCs), laptop PCs, netbook computers, workstations, navigation devices, automotive navigation devices, automotive display apparatuses, automotive apparatuses, cinema display apparatuses, televisions (TVs), wall paper display apparatuses, signage apparatuses, game machines, notebook computers, monitors, cameras, camcorders, home appliances, etc. Also, the apparatus according to an aspect of the present disclosure may be applied to an organic light emitting lighting apparatus or an inorganic light emitting lighting apparatus.

An apparatus according to various aspects of the present disclosure will be described below.

An apparatus according to various aspects of the present disclosure may include a vibration member, a supporting member at a rear surface of the vibration member, and a vibration apparatus including a first vibration generating apparatus connected with the rear surface of the vibration member and a second vibration generating apparatus between the vibration member and the supporting member, the first vibration generating apparatus and the second vibration generating apparatus may be serially connected with each other.

According to various aspects of the present disclosure, the first vibration generating apparatus may be configured to output a sound of a first frequency band, and the second vibration generating apparatus may be configured to output a sound of a second frequency band which differs from the first frequency band.

According to various aspects of the present disclosure, the first frequency band may include a middle-high-frequency band, and the second frequency band may include a middle-low-frequency band.

According to various aspects of the present disclosure, the first vibration generating apparatus may contact the rear surface of the vibration member.

According to various aspects of the present disclosure, may further include a connection member between the first vibration generating apparatus and the vibration member.

According to various aspects of the present disclosure, may further include a control board controlling the first vibration generating apparatus and the second vibration generating apparatus.

According to various aspects of the present disclosure, the first vibration generating apparatus and the second vibration generating apparatus may be connected with the control board through a single signal path.

According to various aspects of the present disclosure, the single signal path may be configured as a closed loop with the control board therein.

According to various aspects of the present disclosure, the control board and the first vibration generating apparatus may be connected with each other through a signal terminal having a first polarity, and the control board and the second vibration generating apparatus may be connected with each other through a signal terminal having a second polarity opposite to the first polarity.

According to various aspects of the present disclosure, the first vibration generating apparatus and the second vibration generating apparatus may be connected with each other through signal terminals having different polarities.

According to various aspects of the present disclosure, the signal terminal having the second polarity of the first vibration generating apparatus may be connected with the signal terminal having the first polarity of the second vibration generating apparatus.

According to various aspects of the present disclosure, at least a portion of the first vibration generating apparatus may overlap the second vibration generating apparatus.

According to various aspects of the present disclosure, the first vibration generating apparatus may be between the vibration member and the second vibration generating apparatus.

According to various aspects of the present disclosure, the second vibration generating apparatus may contact a rear surface of the first vibration generating apparatus.

According to various aspects of the present disclosure, the control board may further include a signal connection member applying a vibration driving signal to the first vibration generating apparatus and the second vibration generating apparatus.

According to various aspects of the present disclosure, the signal connection member may include a first signal connection member connected with a signal terminal having a first polarity of the first vibration generating apparatus, a second signal connection member connected with a signal terminal, having a second polarity opposite to the first polarity, of the second vibration generating apparatus, and a third signal connection member connected between a signal terminal having the second polarity of the first vibration generating apparatus and a signal terminal having the first polarity of the second vibration generating apparatus.

According to various aspects of the present disclosure, the third signal connection member may be not connected with the control board.

According to various aspects of the present disclosure, the first vibration generating apparatus may not overlap the second vibration generating apparatus.

According to various aspects of the present disclosure, the first vibration generating apparatus may include a vibration layer, a first electrode layer at a first surface of the vibration layer, and a second electrode layer at a second surface, differing from the first surface, of the vibration layer.

According to various aspects of the present disclosure, the vibration layer may include a plurality of inorganic material portions having a piezoelectric characteristic, and an organic material portion between the plurality of inorganic material portions.

According to various aspects of the present disclosure, the second vibration generating apparatus may include a frame including an accommodating space, a magnet accommodated into the accommodating space, a bobbin accommodated into the accommodating space, the bobbin being at a periphery of the magnet, and a coil at a periphery of the bobbin.

According to various aspects of the present disclosure, the second vibration generating apparatus may further include a frame cover covering a rear surface of the frame.

According to various aspects of the present disclosure, may further include a heat dissipation member between the frame cover and the rear surface of the frame.

According to various aspects of the present disclosure, the frame may include a first frame into which the magnet, the bobbin, and the coil are accommodated, and a second frame protruding from an edge of the first frame, the second frame being fixed to the supporting member.

According to various aspects of the present disclosure, may further include a control board including a signal connector applying a vibration driving signal to the first vibration generating apparatus and the second vibration generating apparatus, the signal connector may be connected with the first vibration generating apparatus and the second vibration generating apparatus in common.

According to various aspects of the present disclosure, the signal connector may be at a rear surface of the second frame and may be connected with the second vibration generating apparatus, and the supporting member may include a contact hole overlapping the signal connector.

According to various aspects of the present disclosure, the signal connector may include a first signal connection member connected with the first electrode layer of the first vibration generating apparatus, a second signal connection member connected with a first signal terminal of the second vibration generating apparatus, the first signal terminal having a polarity differing from a polarity of the first electrode layer of the first vibration generating apparatus, and a third signal connection member connected between the second electrode layer of the first vibration generating apparatus and a second signal terminal of the second vibration generating apparatus, the second signal terminal having a polarity differing from a polarity of the first signal terminal of the second vibration generating apparatus.

According to various aspects of the present disclosure, the first signal connection member and the third signal connection member may be connected with the first vibration generating apparatus through the contact hole of the supporting member.

According to various aspects of the present disclosure, when a vibration driving signal is not applied from the control board, the third signal connection member may be in an electrical floating state.

According to various aspects of the present disclosure, the vibration member may include one or more of a display panel including a pixel displaying an image, a screen panel on which an image is projected from a display apparatus, a lighting panel, an organic light emitting lighting panel, an inorganic light emitting lighting panel, a signage panel, a vehicular (or car or automotive) interior material, a vehicular exterior material, a vehicular glass window, a vehicular seat interior material, a ceiling material of a building, an interior material of a building, a glass window of a building, an interior material of an aircraft, a glass window of an aircraft, and mirror.

According to various aspects of the present disclosure, the vibration member may include one or more materials of metal, plastic, paper, fiber, cloth, leather, rubber, carbon, and glass.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure. It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An apparatus comprising:

a vibration member;

a supporting member at a rear surface of the vibration member; and a first vibration generating apparatus connected with the rear surface of the vibration member and a second vibration generating apparatus, at least a portion of which is disposed between the vibration member and the supporting member, wherein the first vibration generating apparatus and the second vibration generating apparatus are serially connected with each other, wherein the first vibration generating apparatus is configured to output a sound of a first frequency band, and wherein the second vibration generating apparatus is configured to output a sound of a second frequency band different from the first frequency band.

2. The apparatus of claim 1, wherein the first frequency band comprises a middle-high-frequency band, and wherein the second frequency band comprises a middle-low-frequency band.

3. The apparatus of claim 1, wherein the first vibration generating apparatus contacts the rear surface of the vibration member.

4. The apparatus of claim 3, further comprising a connection member disposed between the first vibration generating apparatus and the vibration member.

5. The apparatus of claim 1, further comprising a control board controlling the first vibration generating apparatus and the second vibration generating apparatus.

6. The apparatus of claim 5, wherein the first vibration generating apparatus and the second vibration generating apparatus are connected to the control board through a single signal path.

7. The apparatus of claim 6, wherein the single signal path is configured as a closed loop with the control board therein.

8. The apparatus of claim 7, wherein the control board and the first vibration generating apparatus are connected with each other through a signal terminal having a first polarity, and wherein the control board and the second vibration generating apparatus are connected with each other through a signal terminal having a second polarity opposite to the first polarity.

9. The apparatus of claim 8, wherein the first vibration generating apparatus and the second vibration generating apparatus are connected to each other through signal terminals having different polarities.

10. The apparatus of claim 9, wherein the signal terminal having the second polarity of the first vibration generating apparatus is connected to the signal terminal having the first polarity of the second vibration generating apparatus.

11. The apparatus of claim 5, wherein at least a portion of the first vibration generating apparatus overlaps the second vibration generating apparatus.

12. The apparatus of claim 11, wherein the first vibration generating apparatus is disposed between the vibration member and the second vibration generating apparatus.

13. The apparatus of claim 12, wherein the second vibration generating apparatus contacts a rear surface of the first vibration generating apparatus.

14. The apparatus of claim 11, wherein the control board further comprises a signal connection member for applying a vibration driving signal to the first vibration generating apparatus and the second vibration generating apparatus.

15. The apparatus of claim 14, wherein the signal connection member comprises:

a first signal connection member connected with a signal terminal having a first polarity of the first vibration generating apparatus;

a second signal connection member connected with a signal terminal, having a second polarity opposite to the first polarity, of the second vibration generating apparatus; and a third signal connection member connected between a signal terminal having the second polarity of the first vibration generating apparatus and a signal terminal having the first polarity of the second vibration generating apparatus.

16. The apparatus of claim 15, wherein the third signal connection member is not connected with the control board.

17. The apparatus of claim 5, wherein the first vibration generating apparatus does not overlap the second vibration generating apparatus.

18. The apparatus of claim 1, wherein the first vibration generating apparatus comprises:

a vibration layer;

a first electrode layer at a first surface of the vibration layer; and a second electrode layer at a second surface of the vibration layer that is different from the first surface.

19. The apparatus of claim 18, wherein the vibration layer comprises:

a plurality of inorganic material portions having a piezoelectric characteristic; and an organic material portion disposed between the plurality of inorganic material portions.

20. The apparatus of claim 19, wherein the second vibration generating apparatus comprises:

a frame including an accommodating space;

a magnet disposed in the accommodating space;

a bobbin disposed the accommodating space, the bobbin being at a periphery of the magnet; and a coil at a periphery of the bobbin.

21. The apparatus of claim 20, wherein the second vibration generating apparatus further comprises a frame cover covering a rear surface of the frame.

22. The apparatus of claim 21, further comprising a heat dissipation member between the frame cover and the rear surface of the frame.

23. The apparatus of claim 20, wherein the frame comprises:

a first frame, wherein the magnet, the bobbin, and the coil are disposed to the first frame; and a second frame protruding from an edge of the first frame, the second frame being fixed to the supporting member.

24. The apparatus of claim 23, further comprising a control board including a signal connector applying a vibration driving signal to the first vibration generating apparatus and the second vibration generating apparatus, wherein the signal connector is connected to the first vibration generating apparatus and the second vibration generating apparatus.

25. The apparatus of claim 24, wherein the signal connector is at a rear surface of the second frame and is connected with the second vibration generating apparatus, and wherein the supporting member comprises a contact hole overlapping the signal connector.

26. The apparatus of claim 25, wherein the signal connector comprises:

a first signal connection member connected with the first electrode layer of the first vibration generating apparatus;

a second signal connection member connected with a first signal terminal of the second vibration generating apparatus, the first signal terminal having a polarity differing from a polarity of the first electrode layer of the first vibration generating apparatus; and a third signal connection member connected between the second electrode layer of the first vibration generating apparatus and a second signal terminal of the second vibration generating apparatus, the second signal terminal having a polarity differing from a polarity of the first signal terminal of the second vibration generating apparatus.

27. The apparatus of claim 26, wherein the first signal connection member and the third signal connection member are connected with the first vibration generating apparatus through the contact hole of the supporting member.

28. The apparatus of claim 26, wherein, when the vibration driving signal is not applied from the control board, the third signal connection member is in an electrical floating state.

29. The apparatus of claim 19, wherein the plurality of inorganic material portions comprises sizes that progressively decrease based on a distance from a center of the vibration layer.

30. The apparatus of claim 29, wherein inorganic material portions having a larger size are configured to reduce a resonance or an interference and reduce a mechanical stress.

31. The apparatus of claim 1, wherein the vibration member comprises one or more of a display panel including a pixel displaying an image, a screen panel on which an image is projected from a display apparatus, a lighting panel, an organic light emitting lighting panel, an inorganic light emitting lighting panel, a signage panel, a vehicular (or car or automotive) interior material, a vehicular exterior material, a vehicular glass window, a vehicular seat interior material, a ceiling material of a building, an interior material of a building, a glass window of a building, an interior material of an aircraft, a glass window of an aircraft, and mirror.

32. The apparatus of claim 1, wherein the vibration member comprises one or more materials of metal, plastic, paper, fiber, cloth, leather, rubber, carbon, and glass.

* * * * *